United States Patent
Sun et al.

(10) Patent No.: US 10,834,665 B2
(45) Date of Patent: Nov. 10, 2020

(54) TECHNIQUES FOR EXTENDED CELL DISCOVERY

(71) Applicant: QUALCOMM Incorporated, San Diego, CA (US)

(72) Inventors: Jing Sun, San Diego, CA (US); Tao Luo, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 16/038,888

(22) Filed: Jul. 18, 2018

(65) Prior Publication Data

US 2019/0037480 A1   Jan. 31, 2019

Related U.S. Application Data

(60) Provisional application No. 62/538,611, filed on Jul. 28, 2017.

(51) Int. Cl.
| | |
|---|---|
| *H04W 48/16* | (2009.01) |
| *H04L 5/00* | (2006.01) |
| *H04W 24/02* | (2009.01) |
| *H04W 64/00* | (2009.01) |

(Continued)

(52) U.S. Cl.
CPC ............ *H04W 48/16* (2013.01); *H04L 5/005* (2013.01); *H04W 24/02* (2013.01); *H04W 64/00* (2013.01); *H04W 24/10* (2013.01); *H04W 36/0061* (2013.01)

(58) Field of Classification Search
CPC ..... H04W 48/16; H04W 24/02; H04W 64/00; H04W 24/10; H04W 36/0061; H04L 5/005; G01S 1/00
See application file for complete search history.

(56) References Cited

U.S. PATENT DOCUMENTS

| | | |
|---|---|---|
| 9,049,680 B2 | 6/2015 | Krishnamurthy et al. |
| 9,544,727 B1 | 1/2017 | McMullen et al. |
| 2012/0213109 A1 | 8/2012 | Xu et al. |

(Continued)

OTHER PUBLICATIONS

International Search Report and Written Opinion—PCT/US2018/042934—ISA/EPO—dated Oct. 16, 2018.

(Continued)

*Primary Examiner* — Curtis A Alia
(74) *Attorney, Agent, or Firm* — Thien T. Nguyen; Holland & Hart LLP

(57) ABSTRACT

Methods, systems, and devices for wireless communication are described. Some wireless systems may benefit from estimation of location of a user equipment (UE) within the system. Such estimations may be based at least in part on pilot signals received from one or more reference points (e.g., base stations, access points, etc.). However, in some cases, the communication range of the pilot signals may be too small to support location estimation for at least some UEs in the system. Further, the pilot signals may consume time-frequency resources, which may reduce throughput for the system. In accordance with the described techniques, highly detectable pilot signals may coexist with synchronization signal (SS) block transmissions. Such coexistence may improve accuracy of location estimations for some, or all UEs in the system, or otherwise benefit the system.

30 Claims, 20 Drawing Sheets

(51) Int. Cl.
*H04W 24/10* (2009.01)
*H04W 36/00* (2009.01)

(56) References Cited

U.S. PATENT DOCUMENTS

| | | |
|---|---|---|
| 2013/0190011 A1* | 7/2013 | Kim .................. H04W 64/00 455/456.1 |
| 2013/0286965 A1 | 10/2013 | Xu et al. |
| 2014/0307685 A1 | 10/2014 | Takano et al. |
| 2016/0157147 A1* | 6/2016 | Saghir ................. H04W 36/04 455/444 |
| 2016/0165501 A1* | 6/2016 | Ishida ............... H04W 36/0058 455/438 |
| 2017/0289831 A1 | 10/2017 | Park et al. |
| 2017/0318522 A1 | 11/2017 | Ly et al. |
| 2018/0020423 A1 | 1/2018 | Wang et al. |

OTHER PUBLICATIONS

Sony: "Coverage Enhancement by Downlink Power-Density Boosting for Low-Cost MTC UEs", 3GPP Draft; R1-130237, 3rd Generation Partnership Project (3GPP), Mobile Competence Centre; 650, Route Des Lucioles; F-06921 Sophia-Antipolis Cedex; France, vol. RAN WG1, No. St Julian; Jan. 28, 2013-Feb. 1, 2013 Jan. 18, 2013, XP050663373, Retrieved from the Internet: URL:http://www.3gpp.org/ftp/tsg_ran/WG1_RL1/TSGR1_72/Docs/ [retrieved on Jan. 18, 2013], 10 pages.

\* cited by examiner

TECHNIQUES FOR EXTENDED CELL DISCOVERY

CROSS REFERENCES

The present Application for patent claims the benefit of U.S. Provisional Patent Application No. 62/538,611 by SUN, et al., entitled "TECHNIQUES FOR EXTENDED CELL DISCOVERY," filed Jul. 28, 2017, assigned to the assignee hereof, and expressly incorporated by reference.

BACKGROUND

The following relates generally to wireless communication, and more specifically to techniques for extended cell discovery.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-s-OFDM). A wireless multiple-access communications system may include a number of base stations or network access nodes, each simultaneously supporting communication for multiple communication devices, which may be otherwise known as user equipment (UE).

Some wireless communications systems support location-based services for mobile wireless devices. Such services may be based at least in part on processing of signals received from one or more reference locations (e.g., base stations, access points, etc.). For example, a location of a UE may be determined (e.g., by the UE or by some network entity) based at least in part on a comparison of received signal strengths of reference signals from different reference locations. In some cases, location computations may be optimized by the use of highly detectable pilot signals. That is, a location of a UE may be estimated more accurately via the use of such highly detectable pilot signals (e.g., because additional pilot signals may improve the statistical validity of an estimated location). However, in some cases, pilot signals may consume wireless resources (e.g., time-frequency resources) which may otherwise be used for data transmissions or other signaling (e.g., which may decrease system throughput or otherwise negatively impact the wireless communications system). Improved techniques for pilot signal-based location estimation may be desired.

SUMMARY

The described techniques relate to improved methods, systems, devices, or apparatuses that support techniques for extended cell discovery. Generally, the described techniques provide for transmission of a highly detectable pilot signal over resources of a synchronization signal (SS) block. In some wireless systems, cellular access and synchronization at a user equipment (UE) may depend on the transmission of synchronization signals, and reference signals, from a base station, in an SS block. In some cases, however, the SS block may contain vacant resource elements (REs) (i.e., resources that are not designated for carrying the payload of the SS block). In accordance with the described techniques, these resources may be re-purposed to carry highly detectable pilot signals. In some cases, a highly detectable pilot signal transmitted from one base station may be synchronized with a SS block transmission from a second base station (i.e., such that the pilot signal of the first base station does not interfere with the SS block payload of the second base station). Various considerations for coexistence of the highly detectable pilot signals with the components of the SS block (i.e., the synchronization signals, reference signals, system information, etc.) are further described below.

A method of wireless communication is described. The method may include establishing a first communication link with a first base station, identifying a set of REs associated with transmission of a SS block, the set of REs covering a first frequency bandwidth for a plurality of symbol periods, and receiving a pilot signal from a second base station over a first subset of the set of REs, the first subset of the set of REs covering a second frequency bandwidth for at least one of the plurality of symbol periods, wherein the first frequency bandwidth comprises the second frequency bandwidth.

An apparatus for wireless communication is described. The apparatus may include means for establishing a first communication link with a first base station, means for identifying a set of REs associated with transmission of a SS block, the set of REs covering a first frequency bandwidth for a plurality of symbol periods, and means for receiving a pilot signal from a second base station over a first subset of the set of REs, the first subset of the set of REs covering a second frequency bandwidth for at least one of the plurality of symbol periods, wherein the first frequency bandwidth comprises the second frequency bandwidth.

Another apparatus for wireless communication is described. The apparatus may include a processor, memory in electronic communication with the processor, and instructions stored in the memory. The instructions may be operable to cause the processor to establish a first communication link with a first base station, identify a set of REs associated with transmission of a SS block, the set of REs covering a first frequency bandwidth for a plurality of symbol periods, and receive a pilot signal from a second base station over a first subset of the set of REs, the first subset of the set of REs covering a second frequency bandwidth for at least one of the plurality of symbol periods, wherein the first frequency bandwidth comprises the second frequency bandwidth.

A non-transitory computer readable medium for wireless communication is described. The non-transitory computer-readable medium may include instructions operable to cause a processor to establish a first communication link with a first base station, identify a set of REs associated with transmission of a SS block, the set of REs covering a first frequency bandwidth for a plurality of symbol periods, and receive a pilot signal from a second base station over a first subset of the set of REs, the first subset of the set of REs covering a second frequency bandwidth for at least one of the plurality of symbol periods, wherein the first frequency bandwidth comprises the second frequency bandwidth.

Some examples of the method, apparatus, and non-transitory computer-readable medium described above may further include processes, features, means, or instructions for measuring a signal strength of the pilot signal received from the second base station. Some examples of the method, apparatus, and non-transitory computer-readable medium described above may further include processes, features, means, or instructions for reporting the measured signal strength to the first base station, wherein a location of the UE may be estimated based at least in part on the reporting.

Some examples of the method, apparatus, and non-transitory computer-readable medium described above may further include processes, features, means, or instructions for detecting a physical cell identifier (PCI) of the second base station based at least in part on the pilot signal.

Some examples of the method, apparatus, and non-transitory computer-readable medium described above may further include processes, features, means, or instructions for receiving, from the first base station, a set of candidate PCIs comprising the PCI of the second base station.

Some examples of the method, apparatus, and non-transitory computer-readable medium described above may further include processes, features, means, or instructions for reporting, to the first base station, the detected PCI of the second base station, a signal strength of the pilot signal, or both.

In some examples of the method, apparatus, and non-transitory computer-readable medium described above, a location of the apparatus (e.g., the UE) may be determined based at least in part on the detected PCI of the second base station, the signal strength of the pilot signal, or both.

Some examples of the method, apparatus, and non-transitory computer-readable medium described above may further include processes, features, means, or instructions for participating in a handover procedure based at least in part on the detected PCI of the second base station, the signal strength of the pilot signal, or both.

Some examples of the method, apparatus, and non-transitory computer-readable medium described above may further include processes, features, means, or instructions for receiving, from the first base station, a primary synchronization signal (PSS), a secondary synchronization signal (SSS), a physical broadcast channel (PBCH), or some combination thereof over a second subset of the set of REs, wherein the first subset and the second subset comprise disjoint subsets.

A method of wireless communication is described. The method may include identifying a set of REs associated with transmission of a SS block, the set of REs covering a first frequency bandwidth for a plurality of symbol periods of a first transmission time interval (TTI) and transmitting a pilot signal over a first subset of the set of REs, wherein the first subset of the set of REs covers a second frequency bandwidth for at least one of the plurality of symbol periods, the first frequency bandwidth comprising the second frequency bandwidth.

An apparatus for wireless communication is described. The apparatus may include means for identifying a set of REs associated with transmission of a SS block, the set of REs covering a first frequency bandwidth for a plurality of symbol periods of a first TTI and means for transmitting a pilot signal over a first subset of the set of REs, wherein the first subset of the set of REs covers a second frequency bandwidth for at least one of the plurality of symbol periods, the first frequency bandwidth comprising the second frequency bandwidth.

Another apparatus for wireless communication is described. The apparatus may include a processor, memory in electronic communication with the processor, and instructions stored in the memory. The instructions may be operable to cause the processor to identify a set of REs associated with transmission of a SS block, the set of REs covering a first frequency bandwidth for a plurality of symbol periods of a first TTI and transmit a pilot signal over a first subset of the set of REs, wherein the first subset of the set of REs covers a second frequency bandwidth for at least one of the plurality of symbol periods, the first frequency bandwidth comprising the second frequency bandwidth.

A non-transitory computer readable medium for wireless communication is described. The non-transitory computer-readable medium may include instructions operable to cause a processor to identify a set of REs associated with transmission of a SS block, the set of REs covering a first frequency bandwidth for a plurality of symbol periods of a first TTI and transmit a pilot signal over a first subset of the set of REs, wherein the first subset of the set of REs covers a second frequency bandwidth for at least one of the plurality of symbol periods, the first frequency bandwidth comprising the second frequency bandwidth.

Some examples of the method, apparatus, and non-transitory computer-readable medium described above may further include processes, features, means, or instructions for puncturing one or more SS block components selected from the group consisting of a PSS, a SSS, and a PBCH. Some examples of the method, apparatus, and non-transitory computer-readable medium described above may further include processes, features, means, or instructions for adjusting a transmit power of the pilot signal based at least in part on the puncturing.

Some examples of the method, apparatus, and non-transitory computer-readable medium described above may further include processes, features, means, or instructions for transmitting a PSS, a SSS, and a PBCH over a second subset of the set of REs, wherein the first and second subset comprise disjoint subsets.

In some examples of the method, apparatus, and non-transitory computer-readable medium described above, the pilot signal may be based at least in part on a PCI of the base station.

Some examples of the method, apparatus, and non-transitory computer-readable medium described above may further include processes, features, means, or instructions for identifying a second set of REs associated with transmission of a second SS block in a second TTI. Some examples of the method, apparatus, and non-transitory computer-readable medium described above may further include processes, features, means, or instructions for configuring a UE to monitor for a second pilot signal of a second base station over a third subset of the second set of REs.

Some examples of the method, apparatus, and non-transitory computer-readable medium described above may further include processes, features, means, or instructions for transmitting the second SS block comprising a PSS, a SSS, and a PBCH over a fourth subset of the second set of REs, wherein the third subset and the fourth subset comprise disjoint sub sets.

In some examples of the method, apparatus, and non-transitory computer-readable medium described above, configuring the UE comprises: providing to the UE a set of candidate PCIs including a PCI of the second base station.

Some examples of the method, apparatus, and non-transitory computer-readable medium described above may further include processes, features, means, or instructions for receiving a report from the UE indicating reception of the second pilot signal.

Some examples of the method, apparatus, and non-transitory computer-readable medium described above may further include processes, features, means, or instructions for estimating a location of the UE based at least in part on the report.

Some examples of the method, apparatus, and non-transitory computer-readable medium described above may further include processes, features, means, or instructions for identifying a third set of REs associated with transmission of a third SS block by a second base station. Some examples of the method, apparatus, and non-transitory computer-readable medium described above may further include processes, features, means, or instructions for configuring a UE to perform cellular measurements of the second base station based at least in part on a format of the third SS block. Some examples of the method, apparatus, and non-transitory computer-readable medium described above may further include processes, features, means, or instructions for receiving a report from the UE indicating a received signal power of the third SS block. Some examples of the method, apparatus, and non-transitory computer-readable medium described above may further include processes, features, means, or instructions for adjusting the reported received signal power based at least in part on the format of the third SS block.

DETAILED DESCRIPTION

Communications within a wireless system may be optimized from knowledge of location of one or more communicating devices within the system. For example, extended cell detection and mobile positioning techniques may be utilized for many location-based services, such as emergency services, advertising, etc., as well as resource scheduling, handover determinations, etc. In some cases, a mobile location may be estimated based on measurements from satellites and terrestrial base stations. Satellite measurements may be utilized in rural and suburban areas. However, satellite measurements may be affected by limited availability in dense urban and indoor areas. Thus, measurements from base stations may be utilized more often for mobile positioning in areas where satellite measurements are not readily available.

In some cases (e.g., in dense urban environments), a location of a device may be estimated based at least in part on processing of pilot signals received at the device. For example, a relatively strong pilot signal from a base station may indicate that the device is relatively near to the base station (i.e., compared to a weaker pilot signal from another base station). In some cases, the accuracy of the location estimation may be improved by increasing the range of the pilot signals. For instance, mobile devices in the system may be provided with additional location reference points. In some cases, however, deployment of such highly detectable pilot signals may consume wireless resources, or otherwise interfere with transmissions within the system.

In accordance with the described techniques, highly detectable pilot reference signals (e.g., which may alternatively be referred to as physical cell identifier (PCI) reference signals (PCI-RS)) may coexist with synchronization signal (SS) block transmissions. Such a communication scheme may leverage the format of the SS block (e.g., which may contain vacant REs) in order to reduce overhead associated with pilot signal transmission. Various considerations for coexistence of PCI-RS with a given SS block are described in detail below.

Aspects of the disclosure are initially described in the context of a wireless communications system. Aspects of the disclosure are then illustrated by and described in the context of an SS block and process flow diagrams. Aspects of the disclosure are further illustrated by and described with reference to apparatus diagrams, system diagrams, and flowcharts that relate to techniques for extended cell discovery.

Figure 1:
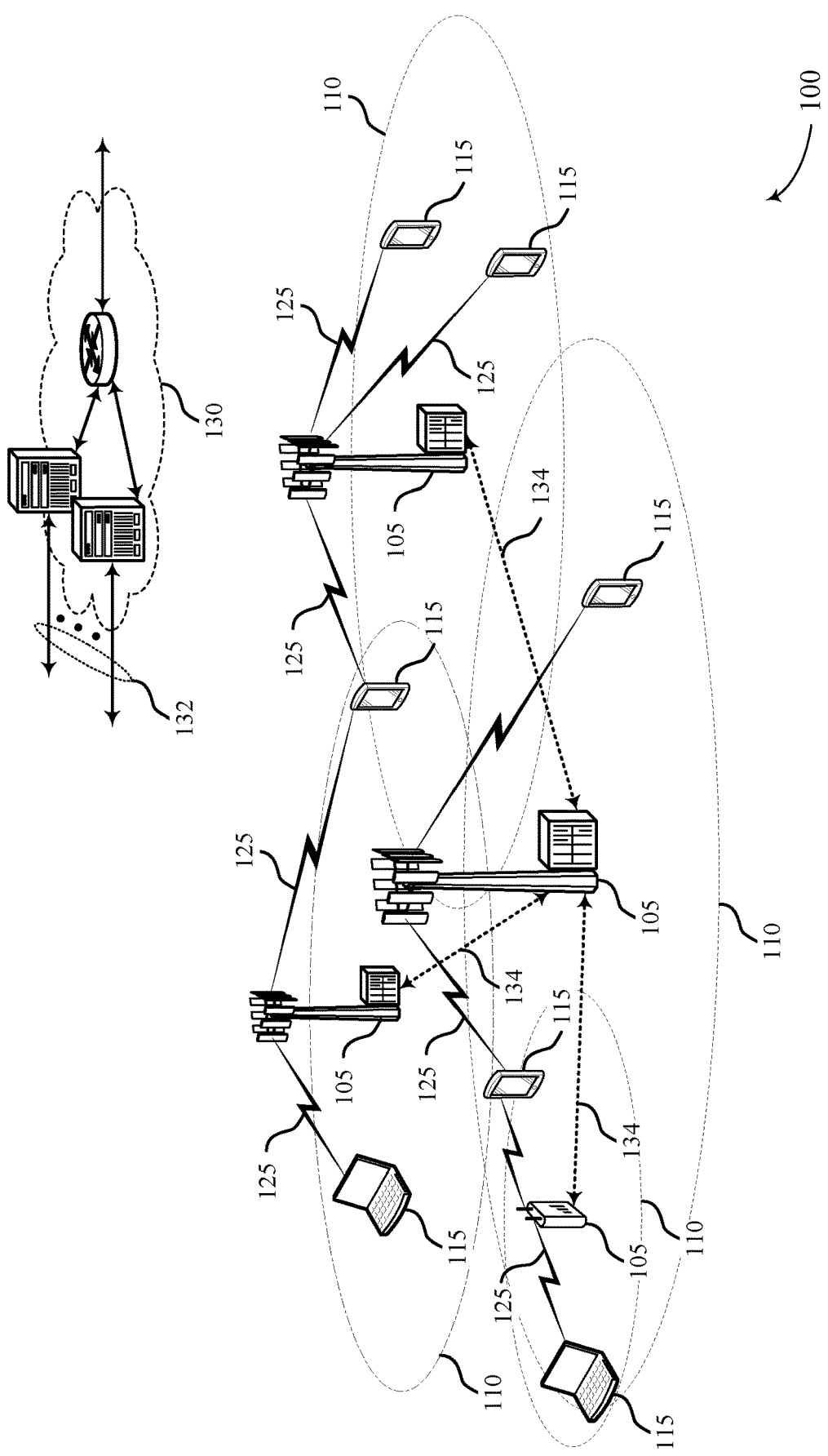
FIGS. 1 and 2 illustrate examples of systems for wireless communications that support techniques for extended cell discovery in accordance with aspects of the present disclosure.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a PCI or a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130).

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Wireless communications system 100 may operate using one or more frequency bands, typically in the range of 300 MHz to 300 GHz. In some examples, wireless communications system 100 may support millimeter wave (mmW) communications between UEs 115 and base stations 105. Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device, or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105, or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs), or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a RE may consist of one symbol period (e.g., a duration of one modulation symbol) and one subcarrier, where the symbol period and subcarrier spacing are inversely related. The number of bits carried by each RE may depend on the modulation scheme (e.g., the order of the modulation scheme). Thus, the more REs that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth, or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Synchronization (e.g., for cell acquisition) may be performed using synchronization signals transmitted by a synchronization source (e.g., a base station 105). Synchronization signals may include a primary synchronization signal (PSS) and a secondary synchronization signal (SSS), each of which may be transmitted as a pseudorandom binary sequence (e.g., a frequency domain m-sequence). A UE 115 performing a cell search may detect a PSS and SSS from a base station 105. The PSS may enable synchronization of slot timing, indicate a physical layer identity value, etc. The SSS may enable radio frame synchronization and provide a cell identity value. The cell identity may be combined with the physical layer identity value to form the PCI, which identifies the cell. The SSS may also enable detection of a duplexing mode, a cyclic prefix (CP) length, or other system information (e.g., bandwidth, subframe index, etc.). A physical broadcast channel (PBCH) may be used to acquire additional system information needed for acquisition (e.g., bandwidth, radio frame index/number, etc.). In some cases, the PBCH may carry a master information block (MIB) and one or more system information blocks (SIBS) for a given cell. Additionally, the PBCH may carry a demodulation reference signal (DMRS) (e.g., to facilitate decoding of the MIB and SIBs).

In some wireless communication systems (e.g., in NR), a base station 105 may transmit SS blocks, over a set of time and frequency resources (e.g., corresponding to four OFDM symbols). In some cases, SS blocks may be referred to as, or contain discovery reference signals. For example, an SS block may include a PSS, an SSS, or a PBCH. Generally, PBCH may be transmitted in a subset of SS block time resources (e.g., in two symbols of the SS block), and the synchronization signals may be transmitted in another subset of the SS block time resources. For example, an SS block may include a PSS in a first OFDM symbol, PBCH in a second and fourth OFDM symbol, and SSS in a third OFDM symbol (e.g., as described with reference to FIG. 3).

In some cases, a number of REs used for transmitting PSS and SSS may be less than a number of REs used for transmitting PBCH. For example, 127 REs may be used in the first and third OFDM symbols of the SS block for transmitting PSS and SSS, while 288 REs may be used in the second and fourth OFDM symbols for transmitting the PBCH. Accordingly, there may be empty REs within the PSS symbol and/or SSS symbol. In some cases, the empty REs may be adapted for use in physical downlink shared channel (PDSCH) rate matching, for transmission of a layer 1 (L1) control channel (e.g., PBCH II), or for carrying a physical downlink control channel (PDCCH) (e.g., the resources may be used to form an aggregation level 4 (AL4) control with DMRS outside). However, such transmission schemes may degrade the low peak to average power ratio (PAPR) of the PSS/SSS frequency domain m-sequences (e.g., such that a higher power amplifier (PA) backoff is required), which may in turn impact the coverage area of the SS block.

Figure 2:
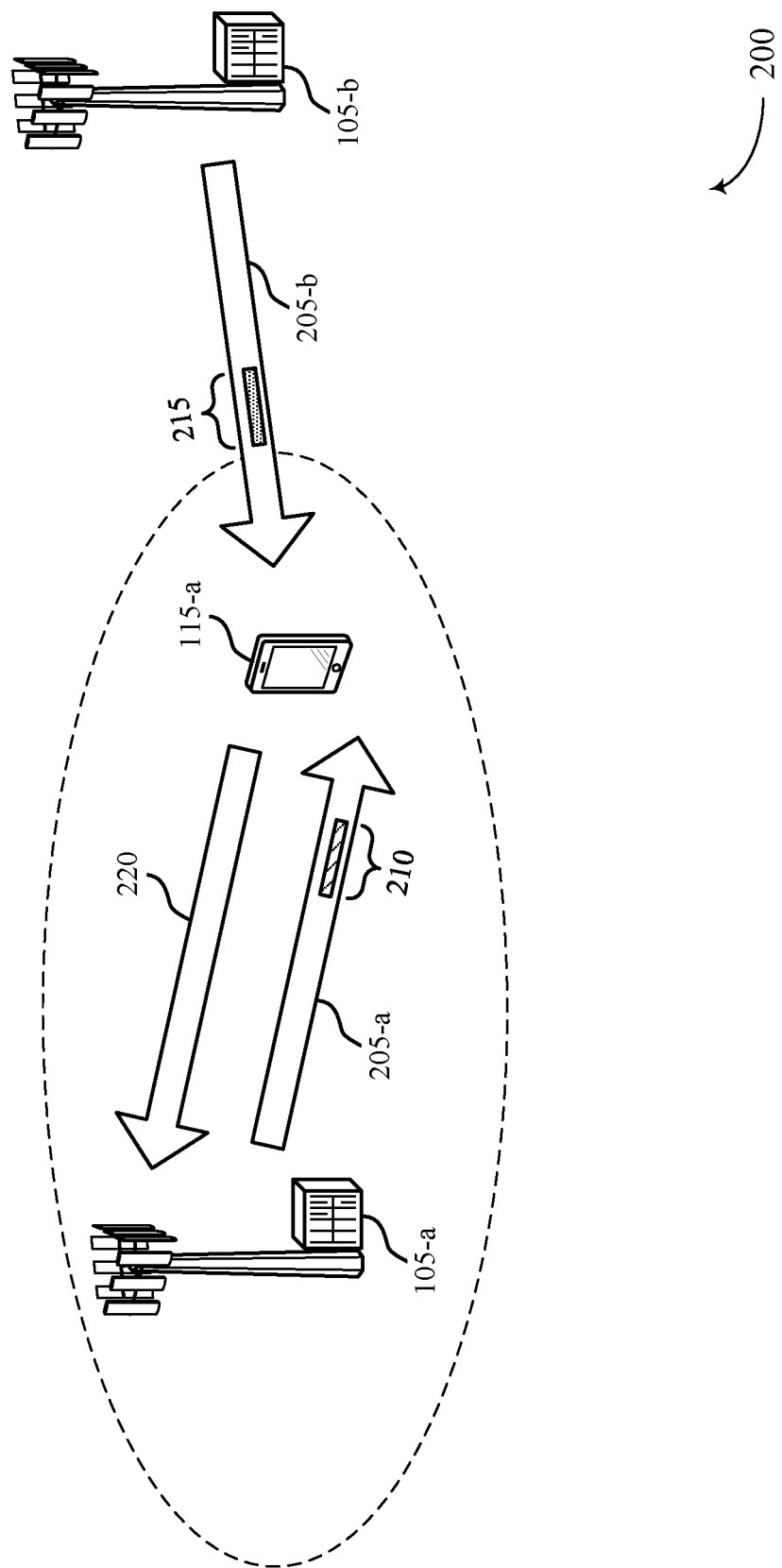

FIG. 2 illustrates an example of a wireless communications system 200 that supports techniques for extended cell discovery in accordance with various aspects of the present disclosure. In some examples, wireless communications system 200 may implement aspects of wireless communications system 100. Wireless communications system 200 includes UE 115-a, base station 105-a, and base station 105-b, which may be examples of the corresponding devices described with reference to FIG. 1.

Base station 105-a may be an example of a serving cell which communicates with UE 115-a over downlink carrier 205-a. Downlink carrier 205-a may be established based on SS block 210, which may be used by the UE 115-a to synchronize with the base station 105-a. For example, SS block 210 may be transmitted using a number of OFDM symbols (e.g., four symbols), and may include a PSS, SSS, and PBCH. In some cases, PSS and SSS transmissions within SS block 210 may be power boosted to increase coverage and assist UE 115-a in synchronization. SS block 210 may span a subset of a bandwidth of downlink carrier 205-a.

In some cases, base station 105-b may exist within wireless communications system 200 but may not serve UE 115-a (e.g., base station 105-a may be neither of the serving cell, or a secondary cell for UE 115-a). In some cases, base station 105-b may be located relatively far away from UE 115-a, or UE 115-a may not be able to receive normal (i.e., non-power-boosted) SS block transmissions from base station 105-b (e.g., due to high levels of interference). In some cases, base station 105-b may transmit a pilot block 215 over downlink carrier 205-b. For example, pilot block 215 may be transmitted omni-directionally, or may be beamformed as described above with reference to FIG. 1. Pilot block 215 may, in some cases, be an example of an SS block (e.g., SS block 210) that includes a highly detectable pilot (i.e., a PCI-RS) for use in extended cell detection. For example, a PCI-RS may be transmitted in pilot block 215 using vacant SS block frequency resources (e.g., a subset of REs of the SS block).

Base stations 105-a, 105-b within wireless communications system 200 may be scheduled (e.g., by some network operator) to either transmit SS blocks containing PCI-RS or normal SS blocks (i.e., SS blocks that do not include PCI-RS). For example, base station 105-b may be scheduled to transmit PCI-RS in an SS block (i.e., pilot block 215), at the same time that base station 105-a is configured to transmit a normal SS block (i.e., SS block 210). That is, in some cases, a silencing pattern may be used to determine which type of SS block (e.g., pilot block 215, or SS block 210) a base station 105 may send at a given time. In such cases, wireless communications system 200 may be an example of a synchronized system, such that SS blocks 210 and pilot blocks 215 transmitted from different base stations 105 may be aligned in time and/or frequency. In some aspects, only a subset of base stations 105 may transmit PCI-RS (i.e., a pilot block 215) at a given time. Thus, a UE 115 (e.g., UE 115-a) may be able to detect the PCI-RS from relatively distant base stations 105 due to low levels of interference in normally empty REs.

In some cases, a centralized network entity may be used to coordinate the transmission of SS blocks 210 and pilot blocks 215. For example, a centralized network entity may schedule the transmission of PCI-RS and convey the scheduling to base station 105-a and/or base station 105-b over backhaul links. Additionally or alternatively, in some cases, scheduling information may be indicated through radio resource control (RRC) signaling. In some cases, the scheduling may be based off of a pseudo-random silencing pattern, or the network entity may select base stations 105 to be used for transmitting PCI-RS.

To enable detection of PCI-RS, UE 115-a may be configured to monitor empty REs (i.e., a subset of REs) within an SS block. For example, UE 115-a may monitor vacant REs of the SS block and identify a PCI-RS transmitted within the SS block. In some cases, UE 115-a may be informed (e.g., through RRC signaling) by a serving cell (i.e., base station 105-a), which neighboring base station(s) 105 are transmitting PCI-RS for a given SS block. For example, base station 105-a may provide UE 115-a with a set of candidate PCIs corresponding to nearby base stations 105. UE 115-a may compare PCI information received in PCI-RS to the candidate PCIs. In some examples, UE 115-a may compare the received PCI information to one or more candidate PCIs, instead of all possible PCIs (e.g., all 1008 possible PCIs). In some cases, this may serve to optimize PCI reporting. In some cases, UE 115-a may then report the PCI via uplink carrier 220 to the base station 105-a. In some aspects, uplink carrier 220 may overlap partially (or completely) in frequency with downlink carrier 205. In some other cases, there may be no overlap between uplink carrier 220, and downlink carrier 205. In some cases, the reported PCI may be used to estimate a location of UE 115-a, or assist in a cell handover procedure.

In some cases, UE 115-a may also be configured to perform measurements on SS blocks 210, or pilot blocks 215, and report the measurements to base station 105-a. In some cases, base station 105-a may configure UE 115-a to monitor and measure a received signal strength of the SS block of a neighboring base station 105 (e.g., base station 105-b). However, when PCI-RS is transmitted within the SS block of the neighboring base station 105, measurements of the SS block may not be accurate (e.g., since the transmission power normally used to send a PSS or SSS may be shared with PCI-RS). In such cases, base station 105-a may avoid configuring UE 115-a to measure the SS block of base station 105-b when base station 105-b is scheduled to transmit PCI-RS. In other cases, base station 105-a may be aware of a power difference between SS blocks that include PCI-RS, and SS blocks that do not. Therefore, base station 105-a may compensate for the power difference when a measurement report is received from UE 115-a (e.g., if the power difference is 3 dB, base station 105-a may add 3 dB to the value reported by UE 115-a). In some cases, the received measurement report may be used to help estimate a location of UE 115-*a*, or assist in a cell handover procedure.

Accordingly, as described herein, a cell of a base station 105 may transmit a known waveform (i.e., a PCI-RS) over vacant REs of a SS block, while other base stations 105 may leave the REs vacant. In some cases, the PCI-RS may be a function of the PCI associated with the cell (e.g., such that a receiving UE 115 may recover the PCI upon detection of the PCI-RS). For example, multiple PCI may map to a given PCI-RS sequence, such that the number of PCI-RS sequences is less than the number of possible PCIs. In this example, the UE 115 may be informed of the PCIs to monitor at a certain time (i.e., via RRC signaling) such that the received PCI-RS may be mapped to a PCI of the candidate PCIs. In some cases, the PCI-RS sequence may support low PAPR transmissions (e.g., when transmitted together with PSS/SSS). In some cases, the PCI to PCI-RS mapping may be a function of the PSS. For example, the PSS may have three possible sequences, and each PSS sequence may have an associated PCI-RS sequence set.

Figure 3:
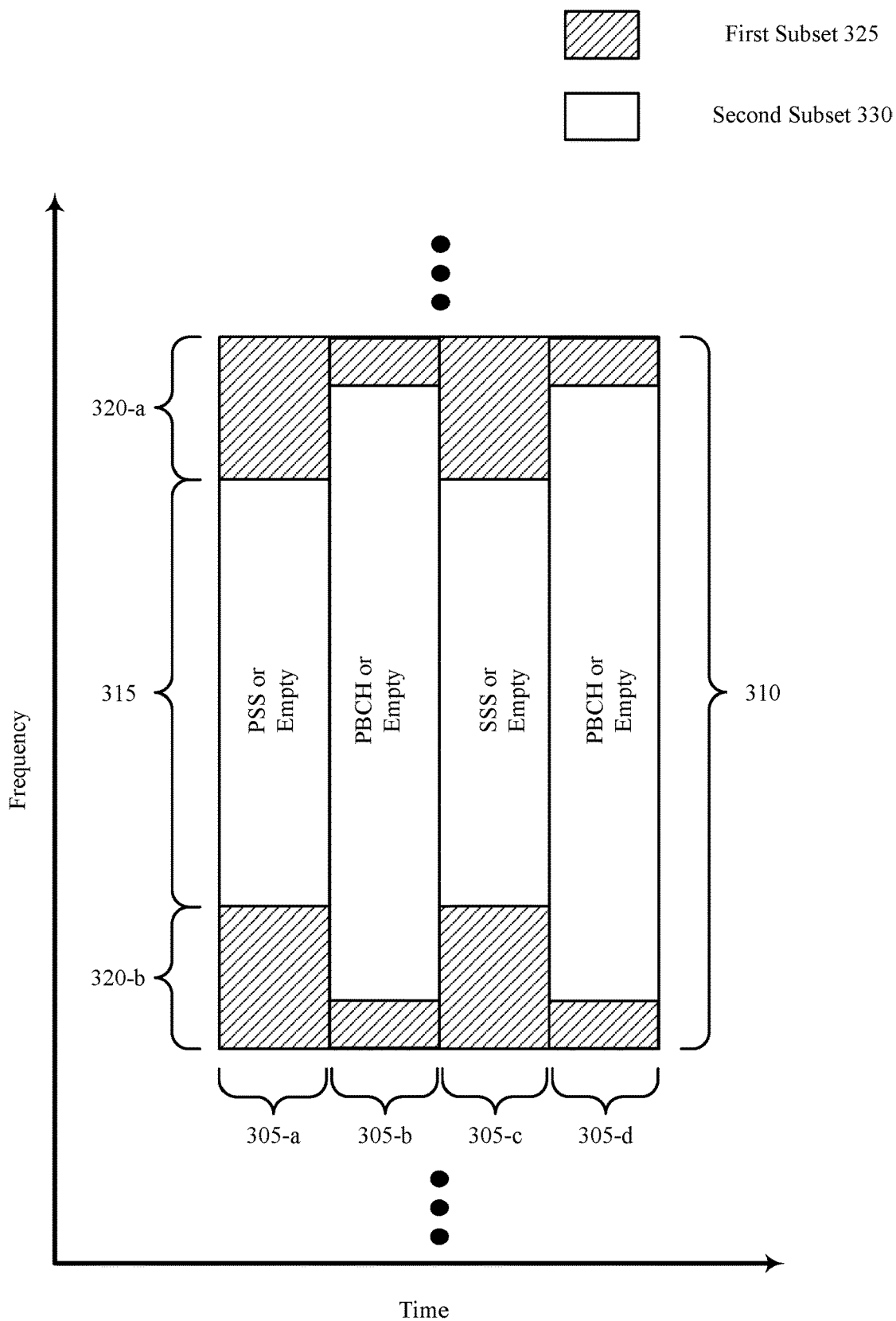
FIG. 3 illustrates an example of a SS block in accordance with aspects of the present disclosure.

FIG. 3 illustrates an example of a SS block 300 in a system that supports techniques for extended cell discovery in accordance with various aspects of the present disclosure. In some examples, SS block 300 may implement aspects of wireless communications system 100. SS block 300 may be an example of the time and frequency resources used by a base station 105 to transmit synchronization signals to one or more UEs 115. In some cases, a highly detectable pilot may be included in SS block 300 to assist in extended cell detection and mobile positioning techniques. SS block 300 may be an example of SS block 210 or pilot block 215 described with reference to FIG. 2.

SS block 300 may be transmitted by a base station 105 using a number of symbol periods 305. For example, SS block 300 may include symbol periods 305-*a*, 305-*b*, 305-*c*, and 305-*d*. In some cases, each of the symbol periods 305 may be an example of an OFDM symbol, and may span a given duration (e.g., as described with reference to FIG. 1).

In one example, and as illustrated, SS block 300 may span frequency bandwidth 310. In some cases, frequency bandwidth 310 may be a portion of the total frequency bandwidth used for downlink transmissions. For example, frequency bandwidth 310 may correspond to a set of REs (e.g., 288 REs (or 24 RBs) in each symbol period 305) used for transmitting SS block 300, while other portions of the carrier bandwidth may be used by a base station 105 for transmitting data or control signals. As illustrated, symbol periods 305-*a*, 305-*c* may include a first subset of REs 325 spanning up to an upper frequency bandwidth 320-*a* and, a lower frequency bandwidth 320-*b* (e.g., which may cumulatively be referred to as a second bandwidth in aspects of the present disclosure). Accordingly, frequency bandwidth 310 comprises the second bandwidth. Additionally, symbol periods 305-*a*, 305-*b* may include a second subset of REs 330 corresponding to an inner frequency bandwidth 315. The second subset of REs 330 (e.g., 144 REs) in symbol period 305-*a* may be used for transmitting PSS. Similarly, the second subset of REs 330 (e.g., 144 REs) in symbol period 305-*c* may be used for transmitting SSS. In some cases, the second subset of REs 330 (e.g., 240 REs (or 20 RBs)) in symbol periods 305-*b*, 305-*d* may be used for transmitting PBCH. In some other cases, the second subset of REs 330 used for transmitting PBCH in symbol periods 305-*b*, 305-*d* may span the entire frequency bandwidth 310 (not shown).

In some cases, the second subset of REs 330 in symbol periods 305-*b*, 305-*d* may carry DMRS, or system information.

In some cases, the first subset of REs 325 may be adapted for extended cell detection. For instance, a base station 105 may transmit a known waveform, such as PCI-RS, using the first subset of REs 325 within SS block 300. The PCI-RS may be associated with a PCI of a transmitting base station 105 (e.g., may be a function of the PCI for cell discovery as described above). Upon reception of a PCI-RS, a UE 115 may identify the base station 105 associated with the PCI-RS (e.g., may identify a PCI associated with the transmitting base station). In some cases, this identification may assist in the determination of location information for the UE 115 (e.g., mobile positioning, triangulation, etc.), may assist in the performance of a handover procedure, etc.

In one example, PCI-RS may be transmitted by a base station 105 by puncturing SS block 300. For instance, during symbol period 305-*a* and/or symbol period 305-*c*, a PCI-RS may be transmitted over the first subset of REs 325, while the second subset of REs 330 (i.e., those typically used for PSS and SSS) may remain empty. That is, the PSS and SSS may be punctured out of SS block 300 (e.g., in favor of PCI-RS). In such examples, PBCH may be transmitted in symbol periods 305-*b*, 305-*d* of the punctured SS block 300. Alternatively, the second subset of REs 330 in symbol periods 305-*b*, 305-*d* may remain vacant (e.g., such that PBCH is also punctured out of SS block 300). In some cases, transmitting PCI-RS by puncturing SS block 300 may allow a base station 105 to increase transmission power of the PCI-RS. That is, transmission power that would typically be used for synchronization signals within SS block 300 may be borrowed to send the PCI-RS. Any performance loss from puncturing SS block 300 (i.e., for initial cell access) may be mitigated if a duty cycle of the PCI-RS is small, or if a base station 105 transmits multiple SS blocks 300 per cycle. For example, in a sub-6 GHz system, up to eight SS blocks 300 may be transmitted per cycle. Performance losses resulting from a punctured SS block 300 may be minimal (e.g., since only one of the eight SS blocks 300 may be punctured in a given cycle).

In other cases, PCI-RS may coexist alongside a PSS and/or SSS within a symbol period 305. For example, a base station 105 may transmit a PCI-RS using the first subset of REs 325 in symbol periods 305-*a*, 305-*c*, and a PSS and SSS using the second subset of REs 330 within the respective symbol periods 305. In such cases, the PCI-RS may use a portion of the transmit power allocated for PSS or SSS. Although transmitting the PCI-RS along with PSS or SSS may decrease the amount of power available to transmit the synchronization signals, the performance loss associated with the decreased transmit power may be smaller than the performance loss incurred if only PCI-RS are transmitted in SS block 300 (i.e., if PSS or SSS are not transmitted). In some cases, the performance loss may be further mitigated if a duty cycle of the PCI-RS is small (i.e., as described above).

In yet another case, PCI-RS may only coexist with a PSS (i.e., may only puncture symbol period 305-*a* associated with the PSS). For example, a base station 105 may transmit a PCI-RS using the first subset of REs 325 during symbol period 305-*a* of SS block 300, while leaving the first subset of REs 325 of symbol period 305-*c* unused. In some cases, leaving the first subset of REs 325 unused during symbol period 305-*c* may enable a UE 115 to perform cell measurements based on the transmitted SSS. For example, as described above, a UE 115 may be configured to perform measurements of neighboring cells based on the SS block of the neighboring cell. Because the transmission power of the SSS is unaltered in cases in which the first subset of REs 325 remains unused during symbol period 305-c, cellular measurements based on the SSS may be unaffected by the PCI-RS transmission in symbol period 305-a.

Accordingly, one or more components of SS block 300 (i.e., where components refers to PSS, SSS, or PBCH) may be punctured to accommodate transmission of PCI-RS. In some cases, the transmit power of the PCI-RS may depend on which components are punctured. For example, the transmit power of the PCI-RS may be greater when PSS and SSS are punctured, as compared to the transmit power when neither are punctured. As described above, the transmission of a SS block 300 containing PCI-RS (e.g., with or without punctured components) from a first base station 105 may be coordinated with transmissions of SS blocks not containing PCI-RS from other base stations 105. Such coordination may increase the range over which the PCI-RS may be detected.

Various PCI-RS designs are considered within the scope of the present disclosure. For example, the design of the PCI-RS may take into consideration a PAPR of the transmitted waveform. In some cases, (e.g., if only a PCI-RS is transmitted during symbol periods 305-a, 305-c, and the PSS or SSS is punctured), the design may only take into consideration the PAPR of the PCI-RS. However, if PSS (or SSS) are also transmitted during the symbol period 305, the PCI-RS may be designed to coexist with low PAPR synchronization signals. In other cases, and as described above, a sequence for the PCI-RS may be a function of the PSS or SSS.

Figure 4:
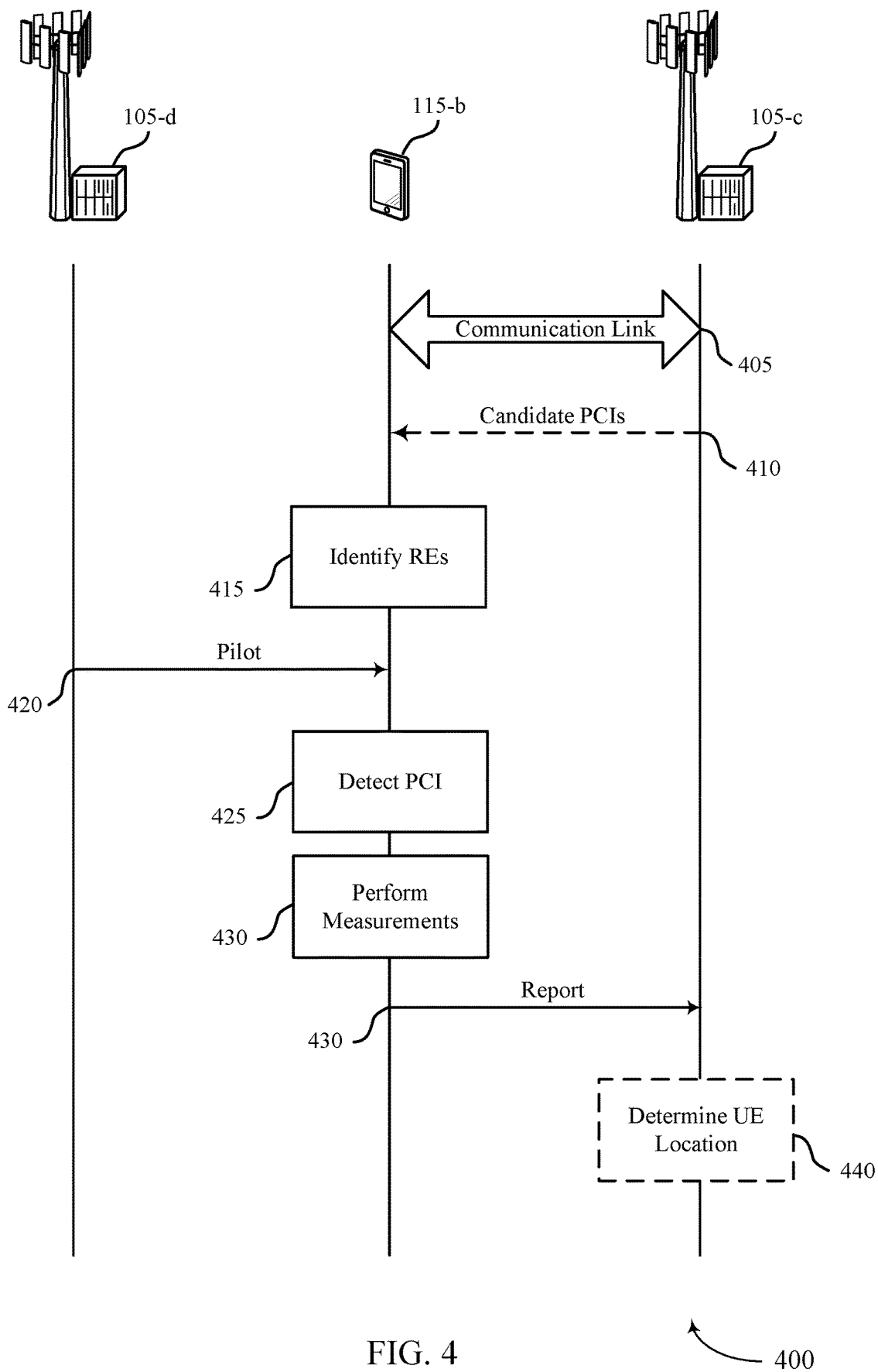
FIG. 4 illustrates an example of a process flow in accordance with aspects of the present disclosure.

FIG. 4 illustrates an example of a process flow 400 in accordance with various aspects of the present disclosure. In some examples, process flow 400 may implement aspects of wireless communications system 100 and/or 200. For example, process flow 400 includes UE 115-b, base station 105-c, and base station 105-d, which may be examples of the corresponding devices described with reference to FIGS. 1 and 2. In one aspect, process flow 400 illustrates an example of PCI-RS transmission(s) by base station 105-c.

At 405, base station 105-c, and UE 115-b may establish a communication link with each other. Accordingly, in some examples, base station 105-c may be referred to as a serving base station for UE 115-b. In some cases, location-based services may serve to optimize the various communications over the established link.

In some cases, at 410, base station 105-c, or some other suitable network entity may provide UE 115-b with a set of candidate PCIs associated with neighboring base stations 105, such as, a PCI of base station 105-d. For instance, the indication may be sent by base station 105-c via downlink control signaling, or RRC signaling. In some cases, for example, based on a communication history, the UE 115-b may maintain a local list of candidate PCIs. In some aspects of the present disclosure, the coverage area of a neighboring base station 105 may encompass UE 115-b.

At 415, the UE 115-b may identify a set of REs associated with transmission of a SS block. In some cases, the set of REs may span a first frequency bandwidth, such as frequency bandwidth 310 described with reference to FIG. 3, for a plurality of symbol periods (e.g., four symbol periods).

At 420, base station 105-d may transmit (and UE 115-b may receive) an SS block containing a pilot signal. In some cases, the transmission may be omni-directional or may be beamformed. For example, base station 105-d may be scheduled, based on network scheduling, to transmit an SS block containing a pilot signal. In some cases, SS block transmissions may be synchronized between base stations. For instance, base station 105-d may be configured to transmit an SS block containing a pilot signal while one or more other base stations 105 may simultaneously transmit SS blocks with vacant REs. In some cases, base station 105-d may transmit the pilot signal over a first subset of the set of REs identified at 415 (e.g., the first subset of REs 325 described with reference to FIG. 3). In some cases, base station 105-d may puncture one or more components of the SS block (e.g., PSS, SSS, and/or PBCH) and may adjust (i.e., increase) a transmission power of the pilot signal based at least in part on the puncturing. In other cases, the pilot signal may coexist with a PSS or SSS in a given symbol period of the SS block. In such cases, the pilot signal may borrow a portion of the total transmission power from the synchronization signals. In some cases, a PBCH may be transmitted within the SS block, which may be independent of the PSS and/or SSS puncturing. In such cases, the first subset of Res, and the second subset of REs (i.e., the REs over which the SS block components including the synchronization signals and/or PBCH are transmitted) may be disjoint subsets (i.e., may not overlap).

At 425, the UE 115-b may detect a PCI associated with the transmission of the PCI-RS at 420. For example, UE 115-b may compare the detected PCI to the set of candidate PCIs (e.g., which may be received at 410). As previously described, in some cases, comparing the detected PCI to candidate PCIs may optimize computational and/or power efficiency, since the UE 115-b may not need to compare the received PCI information to all of the possible PCIs.

At 430, the UE 115-b may perform one or more measurements on the received SS block. For instance, UE 115-b may measure a received signal strength of the pilot signal, or other synchronization signals within the SS block. In some cases, such as due to SS block puncturing, a measurement performed on a PSS (or SSS) may be invalid. In some other cases, base station 105-c may configure UE 115-b to perform cellular measurements for base station 105-d. In some cases, base station 105-c may avoid configuring UE 115-b for SS block measurements, for example, when base station 105-d is scheduled to transmit a pilot signal in the SS block.

At 435, the UE 115-b may send a report indicating a detected PCI, and any measurements performed on the received SS block to base station 105-c. In some cases, base station 105-c, may determine an SS block power reduction associated with transmission of the pilot signal. In some aspects, the base station 105-c, based in part on the network signaling, may be aware of other base stations 105 configured to transmit pilot signals. In such cases, the base station 105-c may compensate for the power difference when a measurement report is received from the UE 115-b.

At 440, in some cases, the base station 105-c may use the reported PCI and/or SS block measurements to estimate the location of UE 115-b. For instance, base station 105-c may estimate a location of UE 115-b using information contained in the measurement report sent at 435. In some cases, the estimated location may be utilized for one or more location-based services, such as emergency services, advertising, navigation, fitness applications, weather, and so forth. Additionally or alternatively, information contained in the report may assist in performing a handover procedure (e.g., from base station 105-c to base station 105-d).

Figure 5:
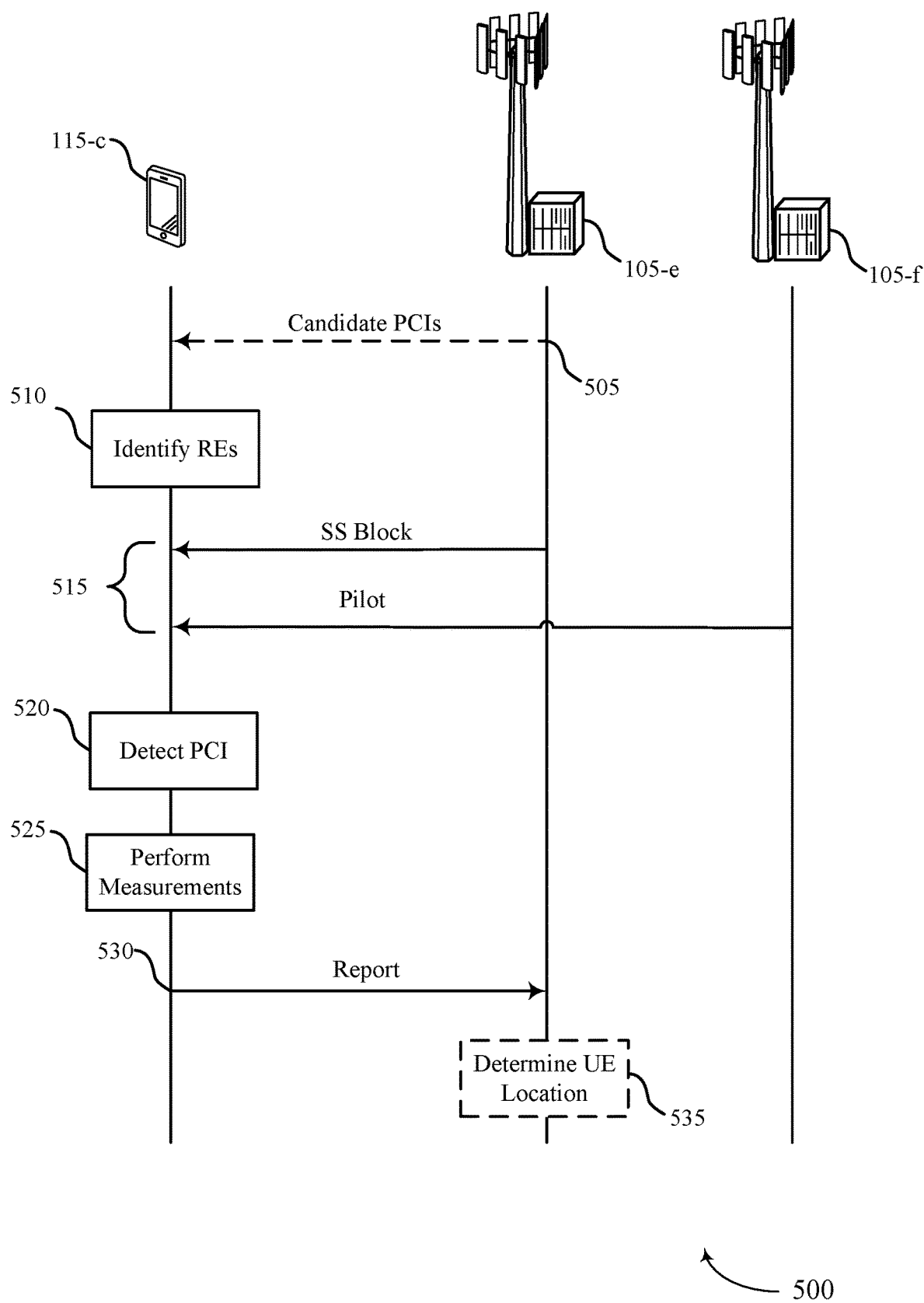
FIG. 5 illustrates an example of a process flow in accordance with aspects of the present disclosure.

FIG. 5 illustrates an example of a process flow 500 in accordance with various aspects of the present disclosure. In some examples, process flow 500 may implement aspects of wireless communications system 100 and/or 200. For example, process flow 500 may include a UE 115-*c*, base station 105-*e*, and base station 105-*f*, which may be examples of the corresponding devices described with reference to FIGS. 1, 2, and 4. In some cases, process flow 500 illustrates an example of a coordinated transmission of a normal SS block by base station 105-*e* (i.e., an SS block that does not contain a PCI-RS), and an SS block containing a PCI-RS by base station 105-*f*. One or both of the transmitted SS blocks may be received by UE 115-*c*, and used for extended cell detection. In some cases, base station 105-*e* may serve as a serving cell for the UE 115-*c*, while base station 105-*f* may be a neighboring cell. In some examples, UE 115-*c* may be located within the coverage area of base station 105-*f*.

At 505, in some cases, base station 105-*e*, or another network entity may provide UE 115-*b* with a set of candidate PCIs associated with one or more neighboring base stations 105 (e.g., base station 105-*f*).

At 510, and as described with reference to 415 in FIG. 4, the UE 115-*c* may identify a set of REs associated with transmission of an SS block. In some cases, the SS blocks may be transmitted using a portion of the total frequency bandwidth available for downlink transmissions, and may be synchronized in time between base stations 105-*e*, and 105-*f*.

At 515, base stations 105-*e*, and 105-*f* may transmit the respective SS blocks. That is, base station 105-*f* may transmit a pilot signal using a first subset of REs within the SS block. Further, in some cases, the pilot signal may be based at least in part on a PCI associated with base station 105-*f*, for instance, with a cell of base station 105-*f*. In some cases, base station 105-*f* may puncture one or more components, for instance, corresponding to a second subset of REs, within the SS block. In one example, the base station 105-*f* may puncture one or more of a PSS, a SSS, or a PBCH from the SS block. Furthermore, in some cases, the base station 105-*f* may adjust (e.g., increase) the transmit power of the pilot signal accordingly. In some cases, base station 105-*e* may transmit synchronization signals, and PBCH over the second subset of REs (e.g., those corresponding to the second subset of REs 330, as described with reference to FIG. 3), but may leave the first subset of REs vacant.

In some cases, at 520, and as described with reference to 425 in FIG. 4, the UE 115-*c* may detect a PCI associated with the transmission of the pilot signal from base station 105-*f*.

At 525, in some cases, UE 115-*c* may perform measurements on the received SS blocks. For example, UE 115-*c* may measure a received signal strength of the pilot signal of base station 105-*f* and/or one or more other synchronization signals associated with base station 105-*e*. In some cases, a serving cell, such as base station 105-*e*, may schedule or request UE 115-*c* to perform one or more channel measurements measurements. In some aspects, the base station 105-*e* may avoid configuring the UE 115-*c* to perform measurements associated with a cell of base station 105-*f*, for example, when base station 105-*f* is scheduled to transmit a pilot signal.

At 530, UE 115-*c* may send a report to base station 105-*e*. In some cases, the report from UE 115-*c* may indicate at least one of a detected PCI, or measurements performed on the received SS block.

At 535, the reported PCI and SS block measurements may be used to estimate a location of UE 115-*c*. For example, base station 105-*e* may estimate a location of UE 115-*c* using information contained in the report sent at 530 (e.g., by using triangulation, or some other method). In some cases, the estimated location may then be utilized for many location based services, such as emergency services, advertising, etc. In some cases, information contained in the report may also assist in performing a handover procedure. For example, a determination may be made to handoff UE 115-*c* (i.e., from base station 105-*e* to base station 105-*f*), based on the received measurements.

Figure 6:
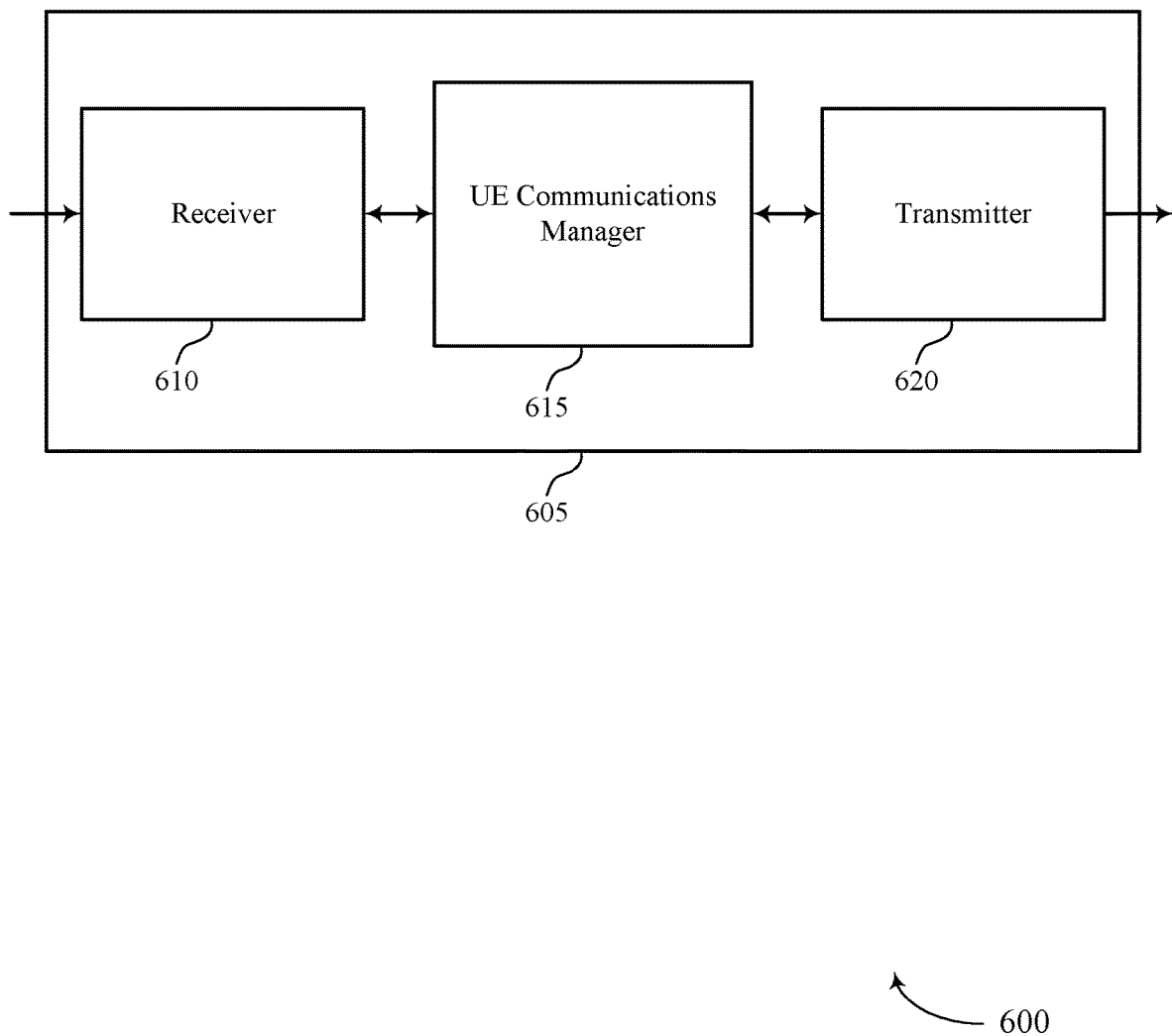
FIGS. 6 through 8 show block diagrams of a device in accordance with aspects of the present disclosure.

FIG. 6 shows a block diagram 600 of a wireless device 605 in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to techniques for extended cell discovery, etc.). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9. UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA), or other programmable logic device, discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof, in accordance with various aspects of the present disclosure.

UE communications manager 615 may establish a first communication link with a first base station. UE communications manager 615 may identify a set of REs associated with transmission of a SS block, the set of REs covering a first frequency bandwidth for a set of symbol periods. UE communications manager 615 may receive a pilot signal from a second base station over a first subset of the set of REs, the first subset of the set of REs covering a second frequency bandwidth for at least one of the set of symbol periods, where the first frequency bandwidth includes the second frequency bandwidth.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
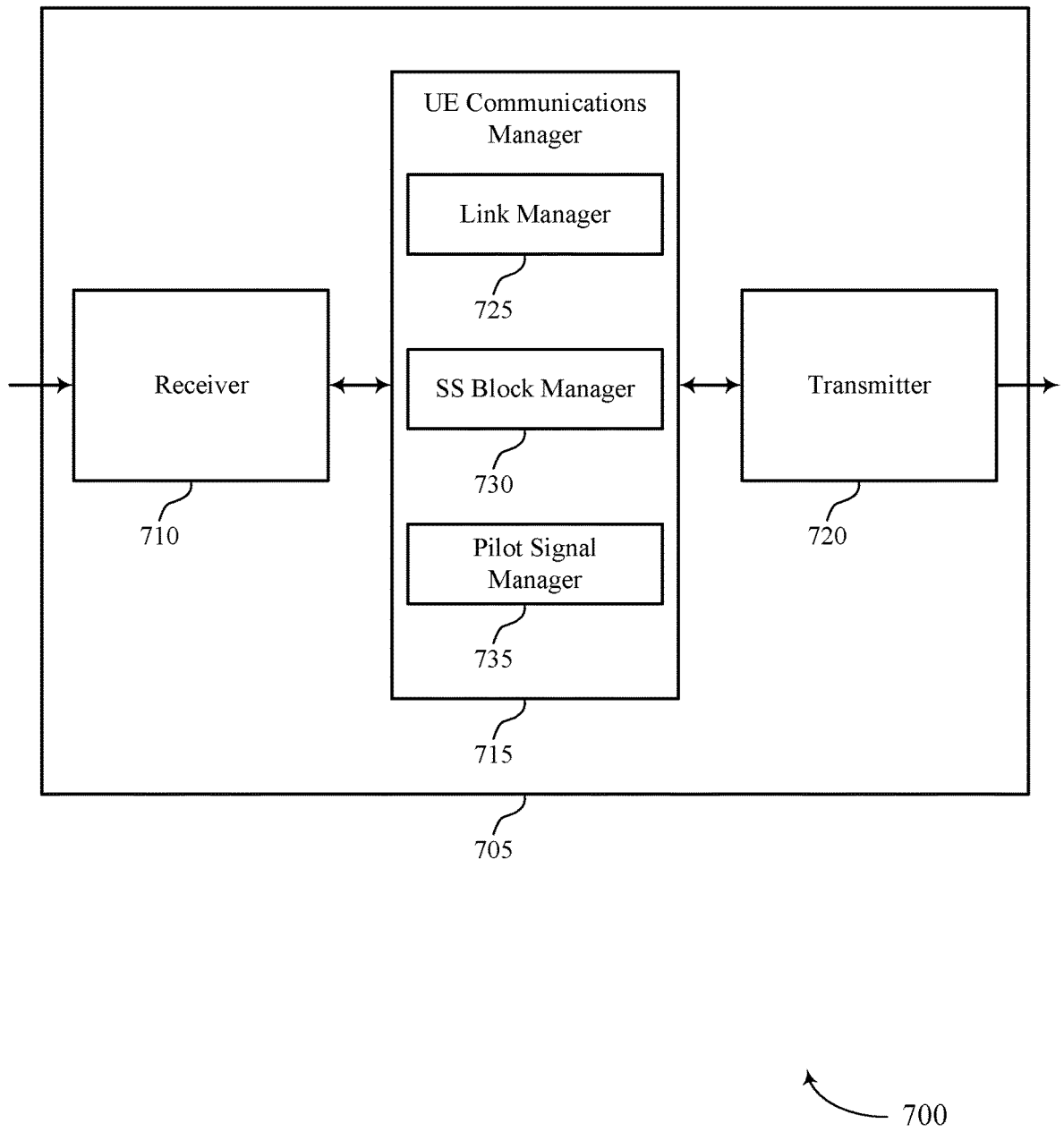

FIG. 7 shows a block diagram 700 of a wireless device 705 in accordance with aspects of the present disclosure. Wireless device 705 may be an example of aspects of a wireless device 605, or a UE 115, as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to techniques for extended cell discovery, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9. UE communications manager 715 may also include link manager 725, SS block manager 730, and pilot signal manager 735. Link manager 725 may establish a first communication link with a first base station.

SS block manager 730 may identify a set of REs associated with transmission of a SS block, the set of REs covering a first frequency bandwidth for a set of symbol periods. SS block manager 730 may receive, from the first base station, a PSS, SSS, PBCH, or some combination thereof, over a second subset of the set of REs, where the first subset and the second subset comprise disjoint subsets.

Pilot signal manager 735 may receive a pilot signal from a second base station over a first subset of the set of REs, the first subset of the set of REs covering a second frequency bandwidth for at least one of the set of symbol periods, where the first frequency bandwidth includes the second frequency bandwidth. Pilot signal manager 735 may measure a signal strength of the pilot signal received from the second base station, and report the measured signal strength to the first base station. In some cases, a location of wireless device 705 is estimated based on the reporting. In some cases, pilot signal manager 735 may report, to the first base station, the detected PCI of the second base station, a signal strength of the pilot signal, or both.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
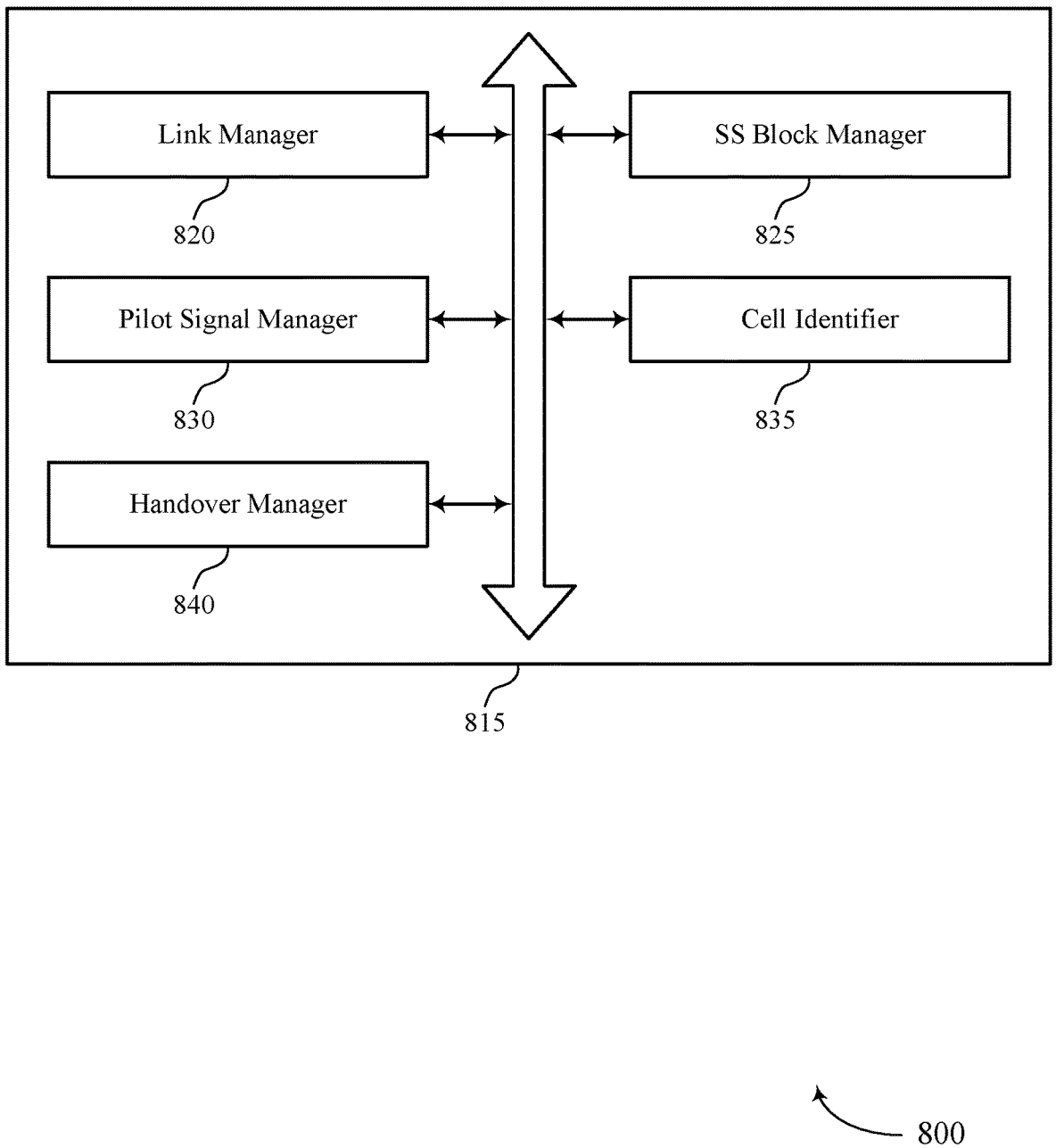

FIG. 8 shows a block diagram 800 of a UE communications manager 815 that in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include link manager 820, SS block manager 825, pilot signal manager 830, cell identifier 835, and handover manager 840. Each of these modules may communicate, directly or indirectly, with one another (e.g., via one or more buses).

Link manager 820 may establish a first communication link with a first base station.

SS block manager 825 may identify a set of REs associated with transmission of a SS block, the set of REs covering a first frequency bandwidth for a set of symbol periods. SS block manager 825 may receive, from the first base station, a PSS, SSS, PBCH, or some combination thereof, over a second subset of the set of REs, where the first subset and the second subset comprise disjoint subsets.

Pilot signal manager 830 may receive a pilot signal from a second base station over a first subset of the set of REs, the first subset of the set of REs covering a second frequency bandwidth for at least one of the set of symbol periods, where the first frequency bandwidth includes the second frequency bandwidth. Pilot signal manager 830 may measure a signal strength of the pilot signal received from the second base station and report the measured signal strength to the first base station. In some cases, a location of a wireless device is estimated based on the reporting. In some cases, pilot signal manager 830 may report, to the first base station, the detected PCI of the second base station, a signal strength of the pilot signal, or both.

Cell identifier 835 may detect a PCI of the second base station based on the pilot signal, and receive from the first base station, a set of candidate PCIs including the PCI of the second base station.

Handover manager 840 may participate in a handover procedure based on the detected PCI of the second base station, the signal strength of the pilot signal, or both.

Figure 9:
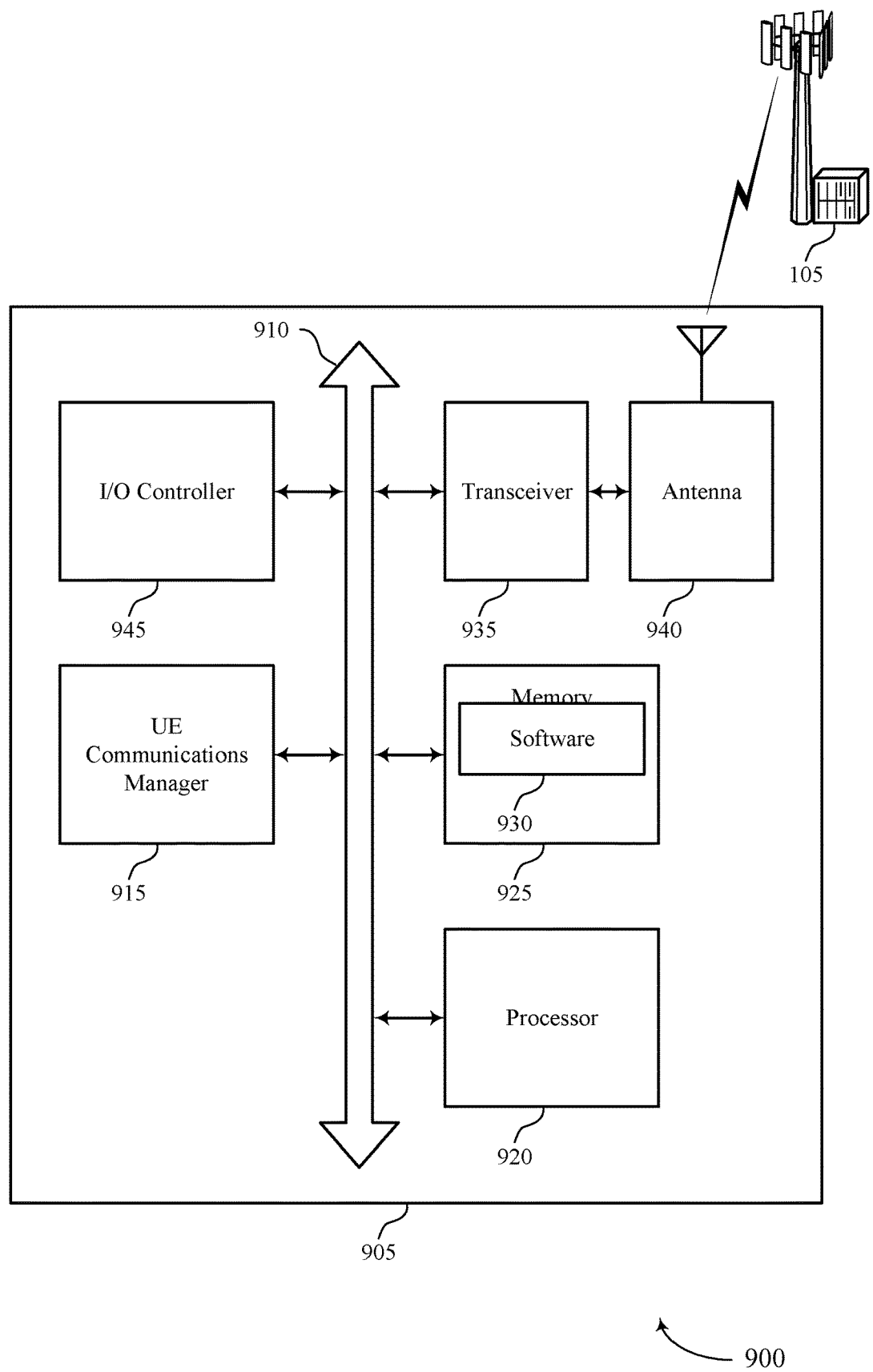
FIG. 9 illustrates a block diagram of a system including a UE in accordance with aspects of the present disclosure.

FIG. 9 shows a diagram of a system 900 including a device 905 in accordance with aspects of the present disclosure. Device 905 may be an example of, or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting techniques for extended cell discovery).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support techniques for extended cell discovery. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
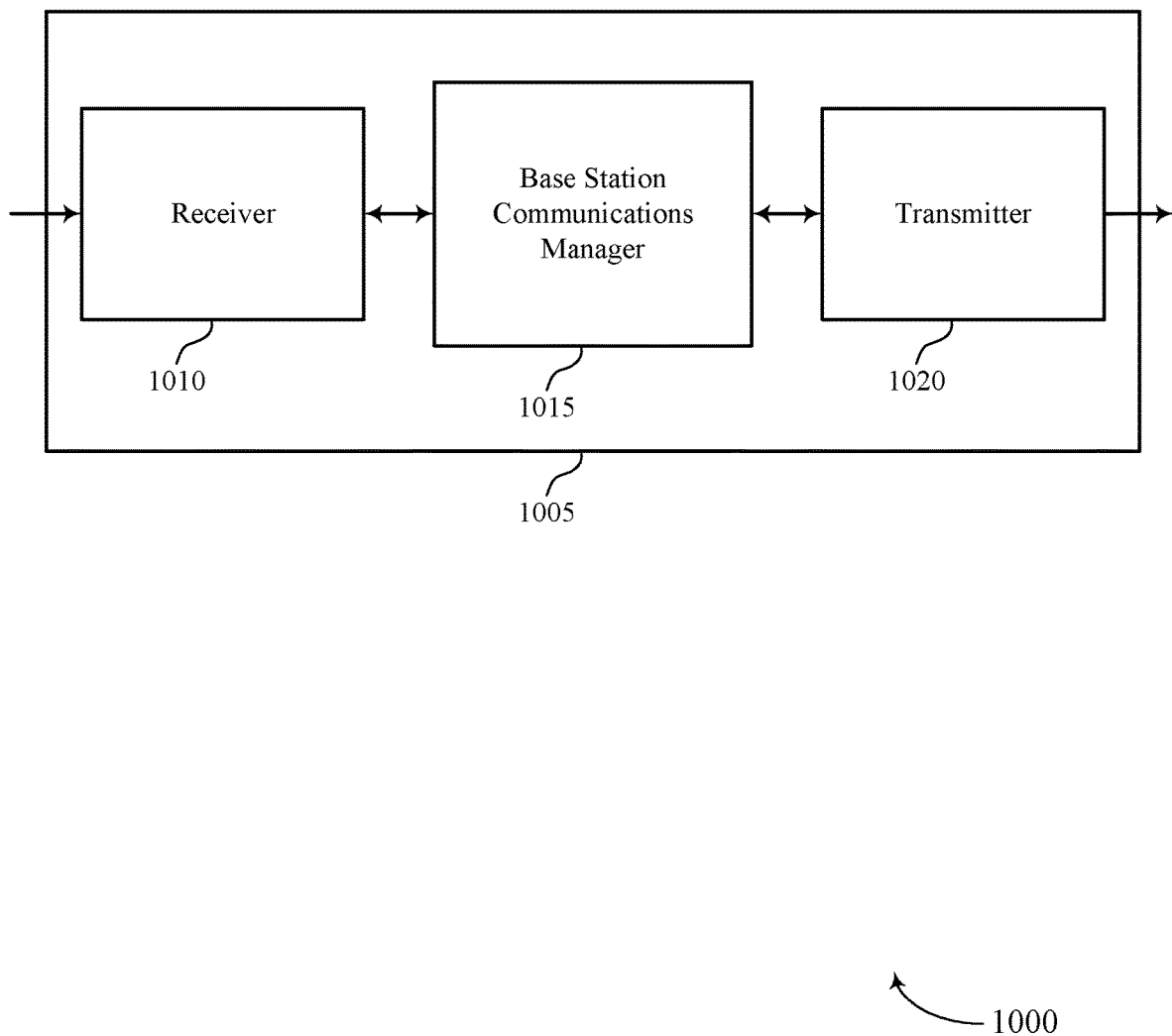
FIGS. 10 through 12 show block diagrams of a device in accordance with aspects of the present disclosure.

FIG. 10 shows a block diagram 1000 of a wireless device 1005 in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to techniques for extended cell discovery, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13. Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may identify a set of REs associated with transmission of a SS block, the set of REs covering a first frequency bandwidth for a set of symbol periods of a first TTI. Base station communications manager 1015 may transmit a pilot signal over a first subset of the set of REs, where the first subset of the set of REs covers a second frequency bandwidth for at least one of the set of symbol periods, the first frequency bandwidth including the second frequency bandwidth.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
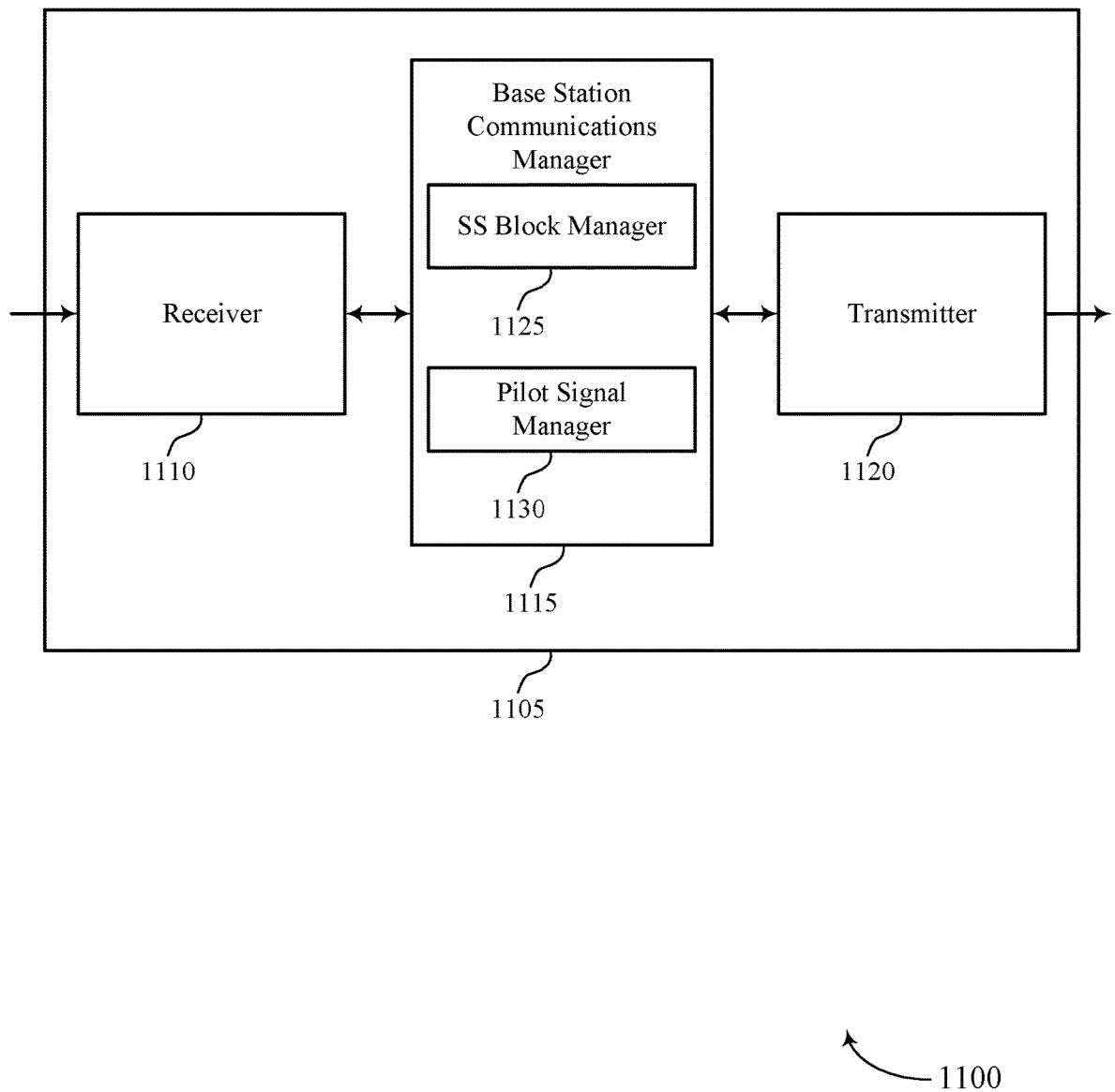

FIG. 11 shows a block diagram 1100 of a wireless device 1105 in accordance with aspects of the present disclosure. Wireless device 1105 may be an example of aspects of a wireless device 1005, or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to techniques for extended cell discovery, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13. Base station communications manager 1115 may also include SS block manager 1125 and pilot signal manager 1130.

SS block manager 1125 may identify a set of REs associated with transmission of a SS block, the set of REs covering a first frequency bandwidth for a set of symbol periods of a first TTI. In some cases, SS block manager 1125 may transmit a PSS, SSS, and PBCH over a second subset of the set of REs, where the first and second subset comprise disjoint subsets. In some examples, SS block manager 1125 may identify a second set of REs associated with transmission of a second SS block in a second TTI, and may transmit the second SS block over a fourth subset of the second set of REs, where the third subset and the fourth subset comprise disjoint subsets. In some cases, SS block manager 1125 may identify a third set of REs associated with transmission of a third SS block by a second base station.

Pilot signal manager 1130 may puncture one or more SS block components selected from the group consisting of a PSS, SSS, and a PBCH. Pilot signal manager 1130 may adjust a transmit power of the pilot signal based on the puncturing. Pilot signal manager 1130 may transmit a pilot signal over a first subset of the set of REs, where the first subset of the set of REs covers a second frequency bandwidth for at least one of the set of symbol periods, and the first frequency bandwidth includes the second frequency bandwidth. Pilot signal manager 1130 may receive a report from the UE indicating reception of the second pilot signal. Pilot signal manager 1130 may receive a report from the UE indicating a received signal power of the third SS block. In some cases, the pilot signal may be based at least in part on a PCI of the wireless device 1105.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
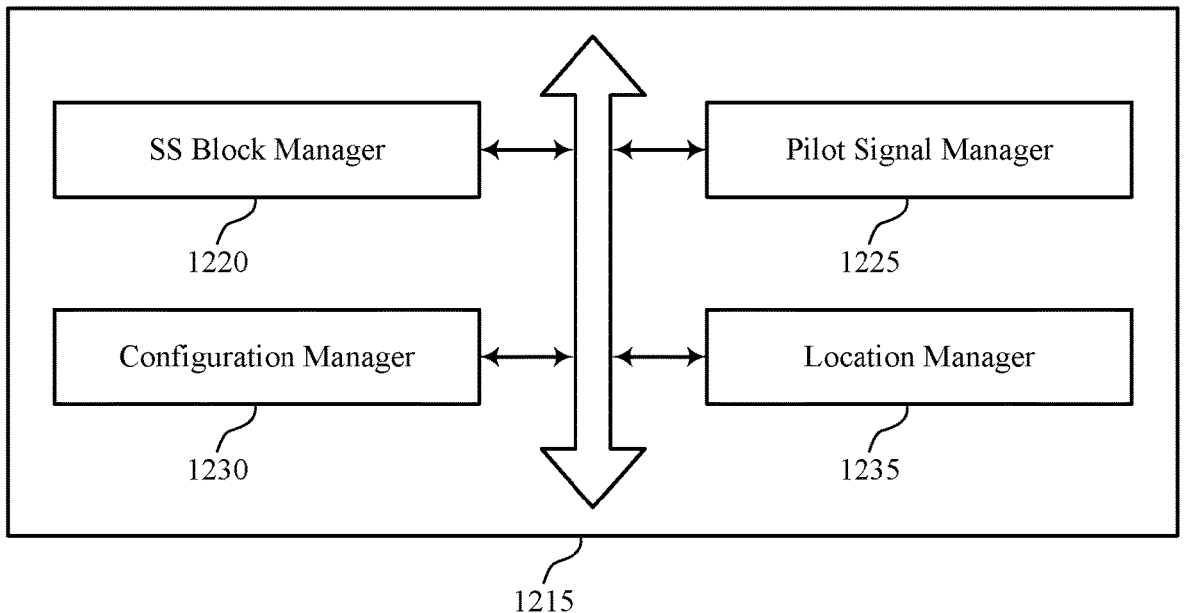

FIG. 12 shows a block diagram 1200 of a base station communications manager 1215 in accordance with aspects of the present disclosure. The base station communications manager 1215 may be an example of aspects of a base station communications manager 1315 described with reference to FIGS. 10, 11, and 13. The base station communications manager 1215 may include SS block manager 1220, pilot signal manager 1225, configuration manager 1230, and location manager 1235. Each of these modules may communicate, directly or indirectly, with one another (e.g., via one or more buses).

SS block manager 1220 may identify a set of REs associated with transmission of a SS block, the set of REs covering a first frequency bandwidth for a set of symbol periods of a first TTI. In some cases, SS block manager 1220 may transmit a PSS, SSS, and PBCH over a second subset of the set of REs, where the first and second subset comprise disjoint subsets. In some examples, SS block manager 1220 may identify a second set of REs associated with transmission of a second SS block in a second TTI and may transmit the second SS block over a fourth subset of the second set of REs, where the third subset and the fourth subset comprise disjoint subsets. In some cases, SS block manager 1220 may identify a third set of REs associated with transmission of a third SS block by a second base station.

Pilot signal manager 1225 may puncture one or more SS block components selected from the group consisting of a PSS, SSS, and a PBCH. Pilot signal manager 1225 may adjust a transmit power of the pilot signal based on the puncturing. Pilot signal manager 1225 may transmit a pilot signal over a first subset of the set of REs, where the first subset of the set of REs covers a second frequency bandwidth for at least one of the set of symbol periods, and the first frequency bandwidth includes the second frequency bandwidth. Pilot signal manager 1225 may receive a report from the UE indicating reception of the second pilot signal. Pilot signal manager 1225 may receive a report from the UE indicating a received signal power of the third SS block. In some cases, the pilot signal may be based at least in part on a PCI of the wireless device 1105.

Configuration manager 1230 may configure a UE to monitor for a second pilot signal of a second base station over a third subset of the second set of REs. Configuration manager 1230 may configure a UE to perform cellular measurements of the second base station based on a format of the third SS block. In some cases, configuring the UE includes providing to the UE a set of candidate PCIs, including a PCI of the second base station.

Location manager 1235 may estimate a location of the UE based on the report, and adjust the reported received signal power based on the format of the third SS block.

Figure 13:
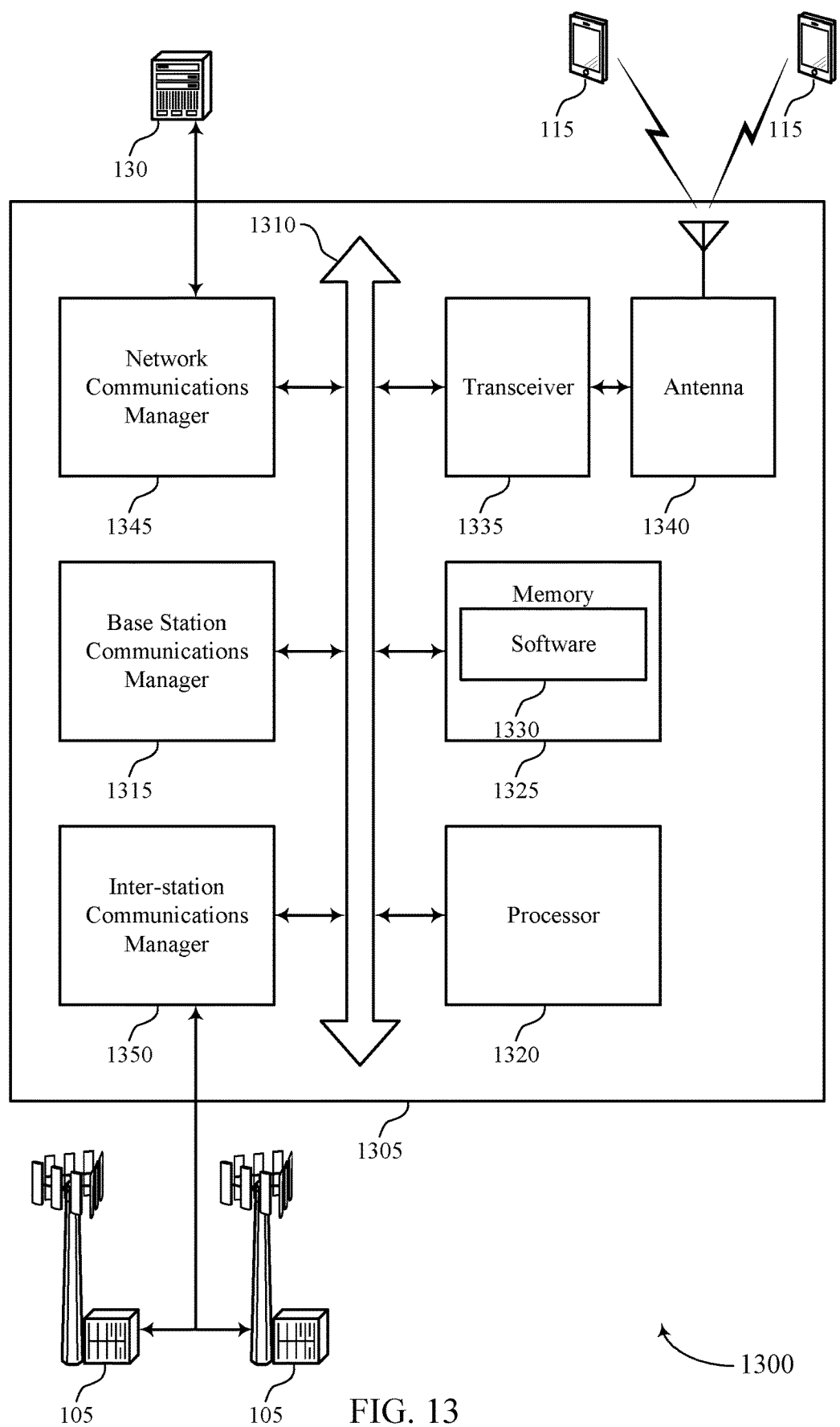
FIG. 13 illustrates a block diagram of a system including a base station in accordance with aspects of the present disclosure.

FIG. 13 shows a diagram of a system 1300 including a device 1305 in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting techniques for extended cell discovery).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support techniques for extended cell discovery. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
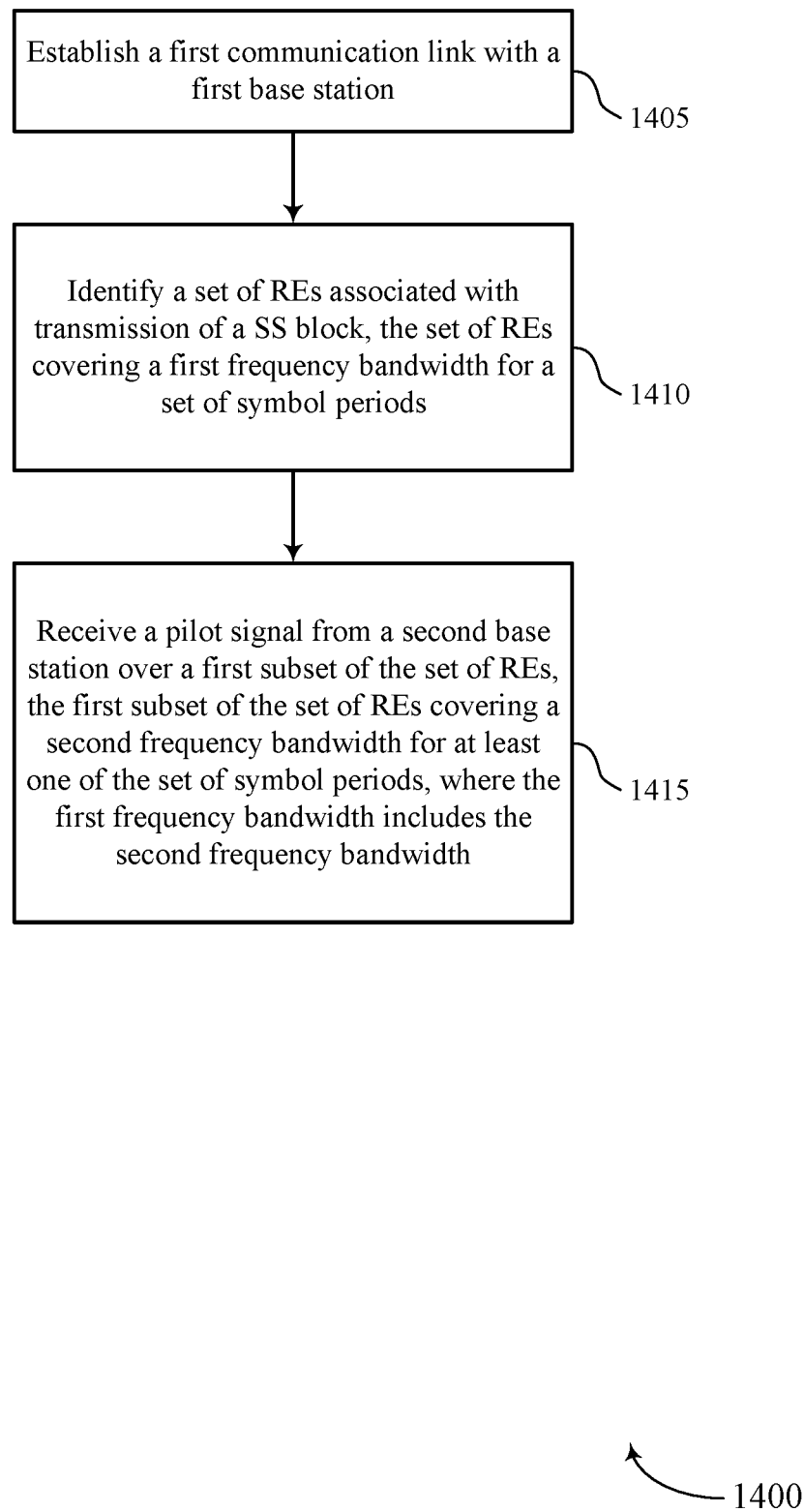
FIGS. 14 through 20 illustrate methods for techniques for extended cell discovery in accordance with aspects of the present disclosure.

FIG. 14 shows a flowchart illustrating a method 1400 in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405, the UE 115 may establish a first communication link with a first base station. The operations of 1405 may be performed according to the methods described herein. In certain examples, aspects of the operations of 1405 may be performed by a link manager as described with reference to FIGS. 6 through 9.

At 1410, the UE 115 may identify a set of REs associated with transmission of a SS block, the set of REs covering a first frequency bandwidth for a plurality of symbol periods. The operations of 1410 may be performed according to the methods described herein. In certain examples, aspects of the operations of 1410 may be performed by a SS block manager as described with reference to FIGS. 6 through 9.

At 1415, the UE 115 may receive a pilot signal from a second base station over a first subset of the set of REs, the first subset of the set of REs covering a second frequency bandwidth for at least one of the plurality of symbol periods, wherein the first frequency bandwidth comprises the second frequency bandwidth. The operations of 1415 may be performed according to the methods described herein. In certain examples, aspects of the operations of 1415 may be performed by a pilot signal manager as described with reference to FIGS. 6 through 9.

Figure 15:
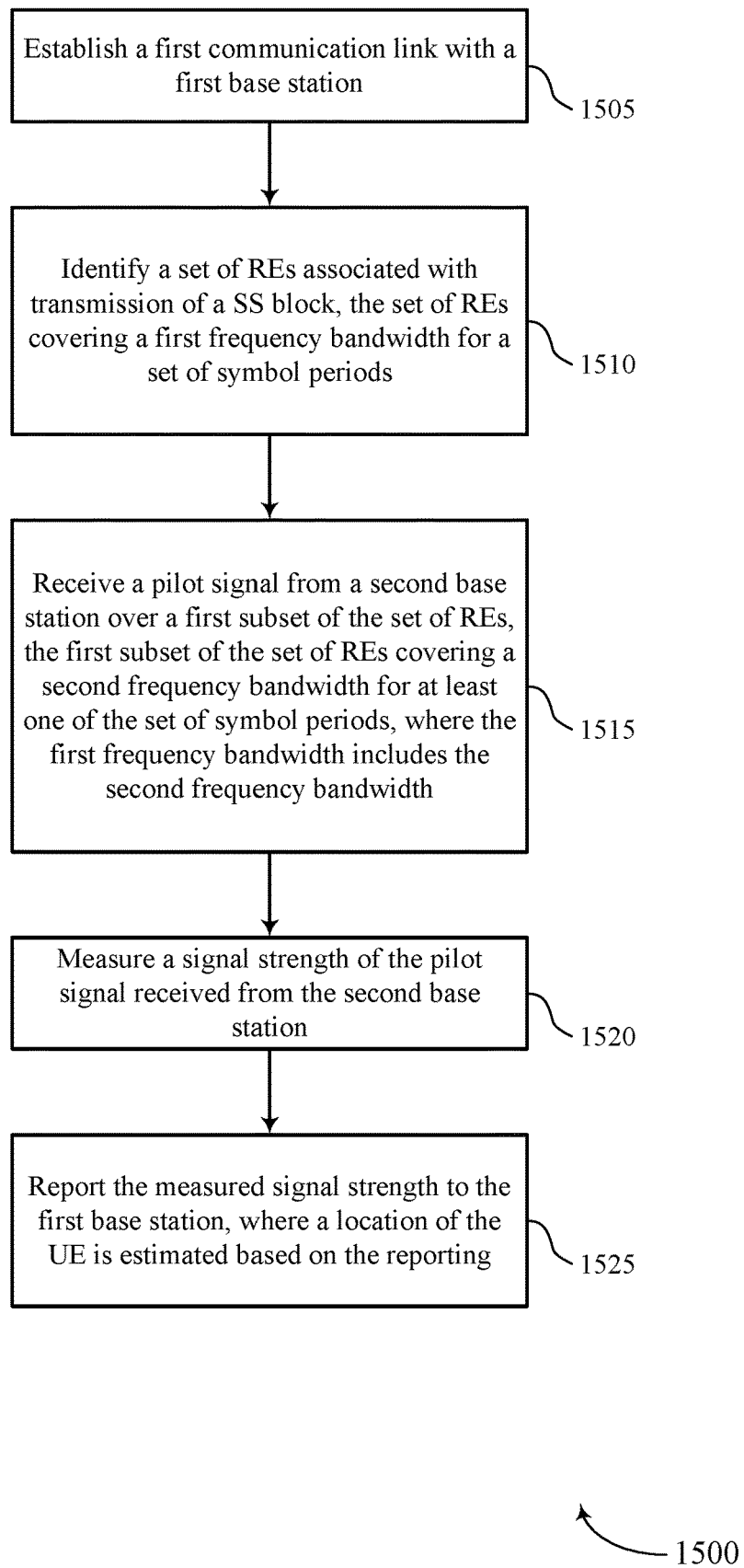

FIG. 15 shows a flowchart illustrating a method 1500 in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1505, the UE 115 may establish a first communication link with a first base station. The operations of 1505 may be performed according to the methods described herein. In certain examples, aspects of the operations of 1505 may be performed by a link manager as described with reference to FIGS. 6 through 9.

At 1510, the UE 115 may identify a set of REs associated with transmission of a SS block, the set of REs covering a first frequency bandwidth for a plurality of symbol periods. The operations of 1510 may be performed according to the methods described herein. In certain examples, aspects of the operations of 1510 may be performed by a SS block manager as described with reference to FIGS. 6 through 9.

At 1515, the UE 115 may receive a pilot signal from a second base station over a first subset of the set of REs, the first subset of the set of REs covering a second frequency bandwidth for at least one of the plurality of symbol periods, wherein the first frequency bandwidth comprises the second frequency bandwidth. The operations of 1515 may be performed according to the methods described herein. In certain examples, aspects of the operations of 1515 may be performed by a pilot signal manager as described with reference to FIGS. 6 through 9.

At 1520, the UE 115 may measure a signal strength of the pilot signal received from the second base station. The operations of 1520 may be performed according to the methods described herein. In certain examples, aspects of the operations of 1520 may be performed by a pilot signal manager as described with reference to FIGS. 6 through 9.

At 1525 the UE 115 may report the measured signal strength to the first base station, wherein a location of the UE is estimated based at least in part on the reporting. The operations of 1525 may be performed according to the methods described herein. In certain examples, aspects of the operations of 1525 may be performed by a pilot signal manager as described with reference to FIGS. 6 through 9.

Figure 16:
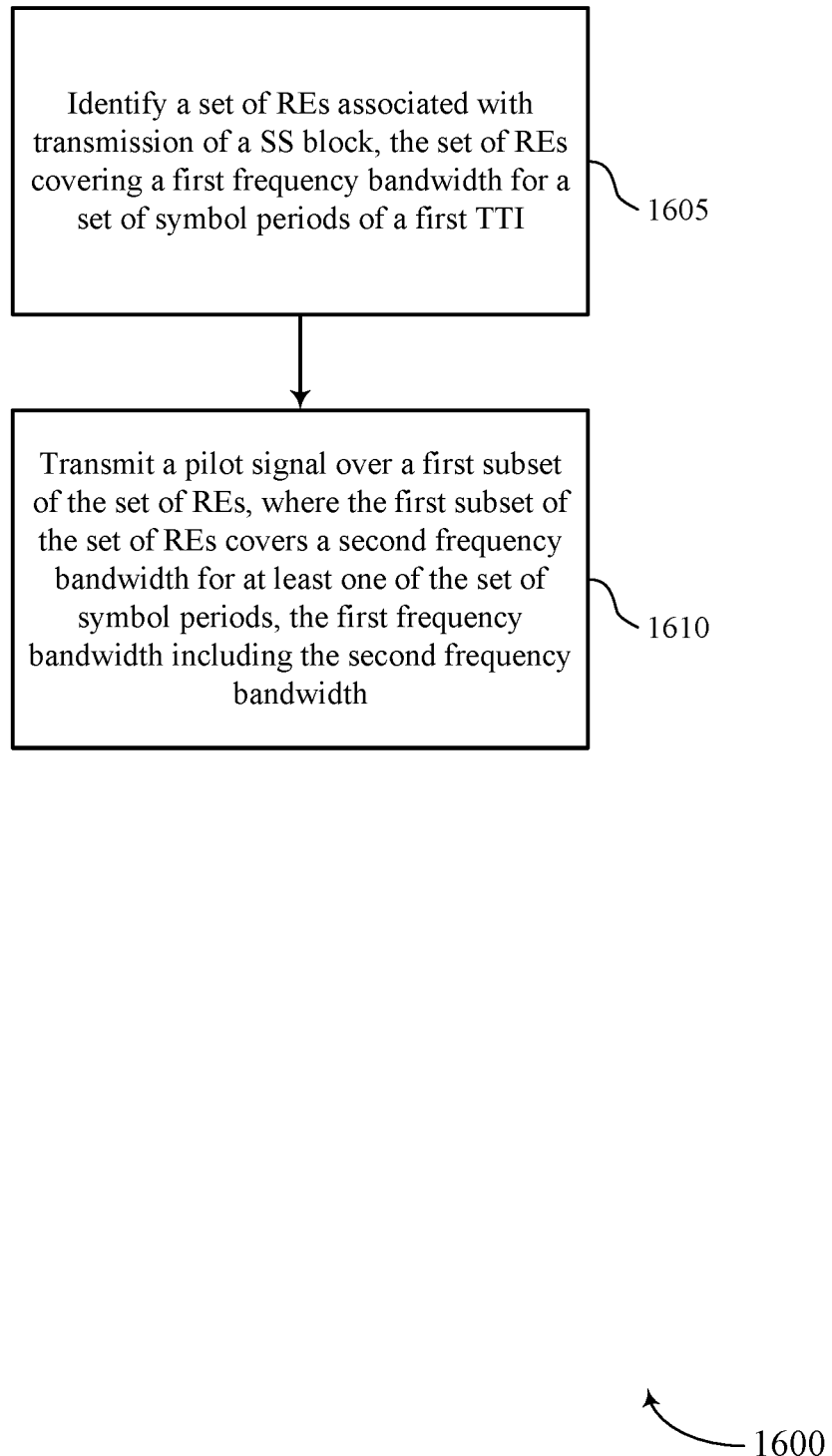

FIG. 16 shows a flowchart illustrating a method 1600 in accordance with aspects of the present disclosure. The operations of method 1600 may be implemented by a base station 105 or its components as described herein. For example, the operations of method 1600 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1605, the base station 105 may identify a set of REs associated with transmission of a SS block, the set of REs covering a first frequency bandwidth for a plurality of symbol periods of a first TTI. The operations of 1605 may be performed according to the methods described herein. In certain examples, aspects of the operations of 1605 may be performed by a SS block manager as described with reference to FIGS. 10 through 13.

At 1610, the base station 105 may transmit a pilot signal over a first subset of the set of REs, wherein the first subset of the set of REs covers a second frequency bandwidth for at least one of the plurality of symbol periods, the first frequency bandwidth comprising the second frequency bandwidth. The operations of 1610 may be performed according to the methods described herein. In certain examples, aspects of the operations of 1610 may be performed by a pilot signal manager as described with reference to FIGS. 10 through 13.

Figure 17:
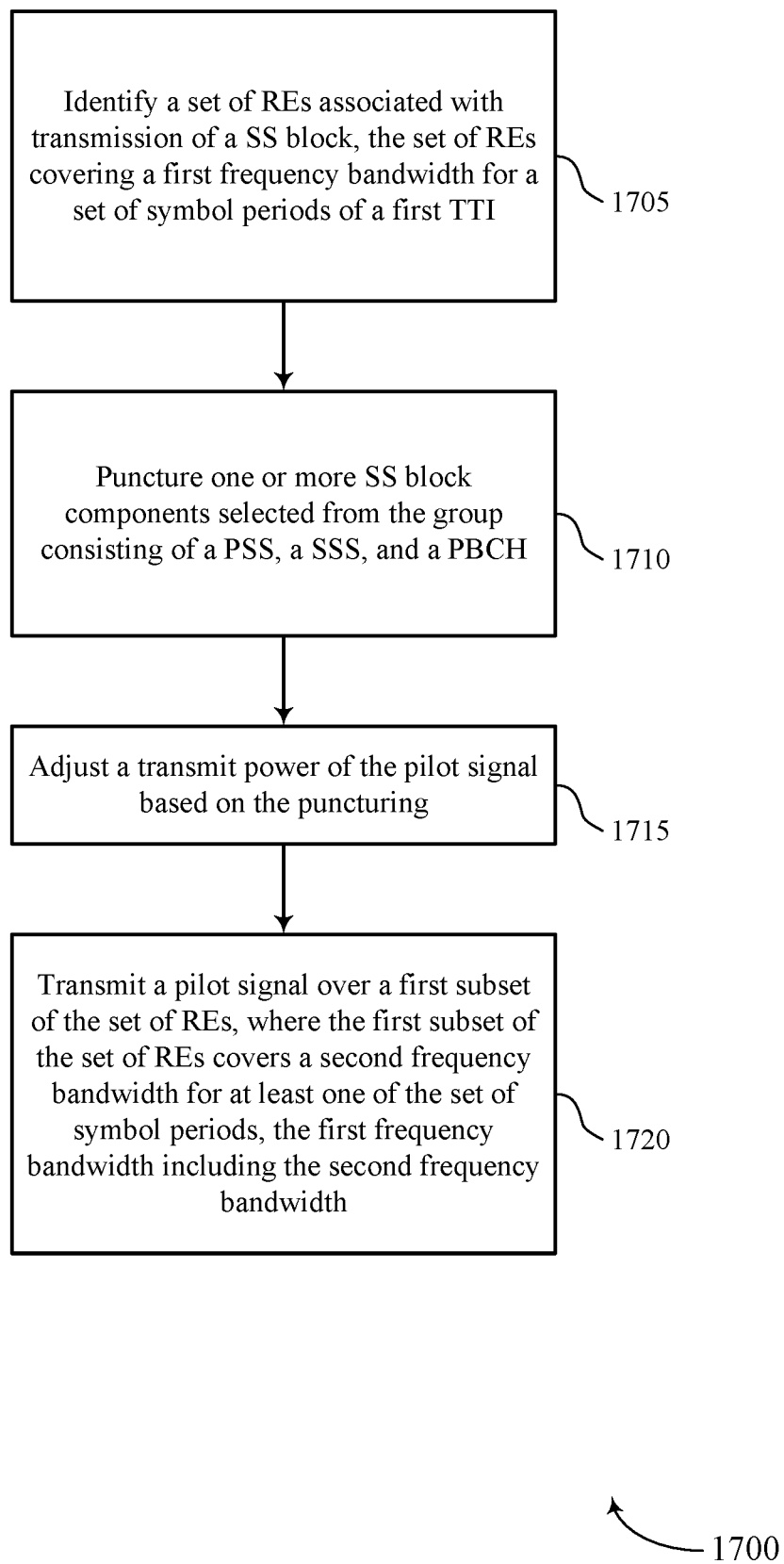

FIG. 17 shows a flowchart illustrating a method 1700 in accordance with aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1705, the base station 105 may identify a set of REs associated with transmission of a SS block, the set of REs covering a first frequency bandwidth for a plurality of symbol periods of a first TTI. The operations of 1705 may be performed according to the methods described herein. In certain examples, aspects of the operations of 1705 may be performed by a SS block manager as described with reference to FIGS. 10 through 13.

At 1710, the base station 105 may puncture one or more SS block components selected from the group consisting of a PSS, SSS, and PBCH. The operations of 1710 may be performed according to the methods described herein. In certain examples, aspects of the operations of 1710 may be performed by a pilot signal manager as described with reference to FIGS. 10 through 13.

At 1715, the base station 105 may adjust a transmit power of the pilot signal based at least in part on the puncturing. The operations of 1715 may be performed according to the methods described herein. In certain examples, aspects of the operations of 1715 may be performed by a pilot signal manager as described with reference to FIGS. 10 through 13.

At 1720, the base station 105 may transmit the pilot signal over a first subset of the set of REs, wherein the first subset of the set of REs covers a second frequency bandwidth for at least one of the plurality of symbol periods, the first frequency bandwidth comprising the second frequency bandwidth. The operations of 1720 may be performed according to the methods described herein. In certain examples, aspects of the operations of 1720 may be performed by a pilot signal manager as described with reference to FIGS. 10 through 13.

Figure 18:
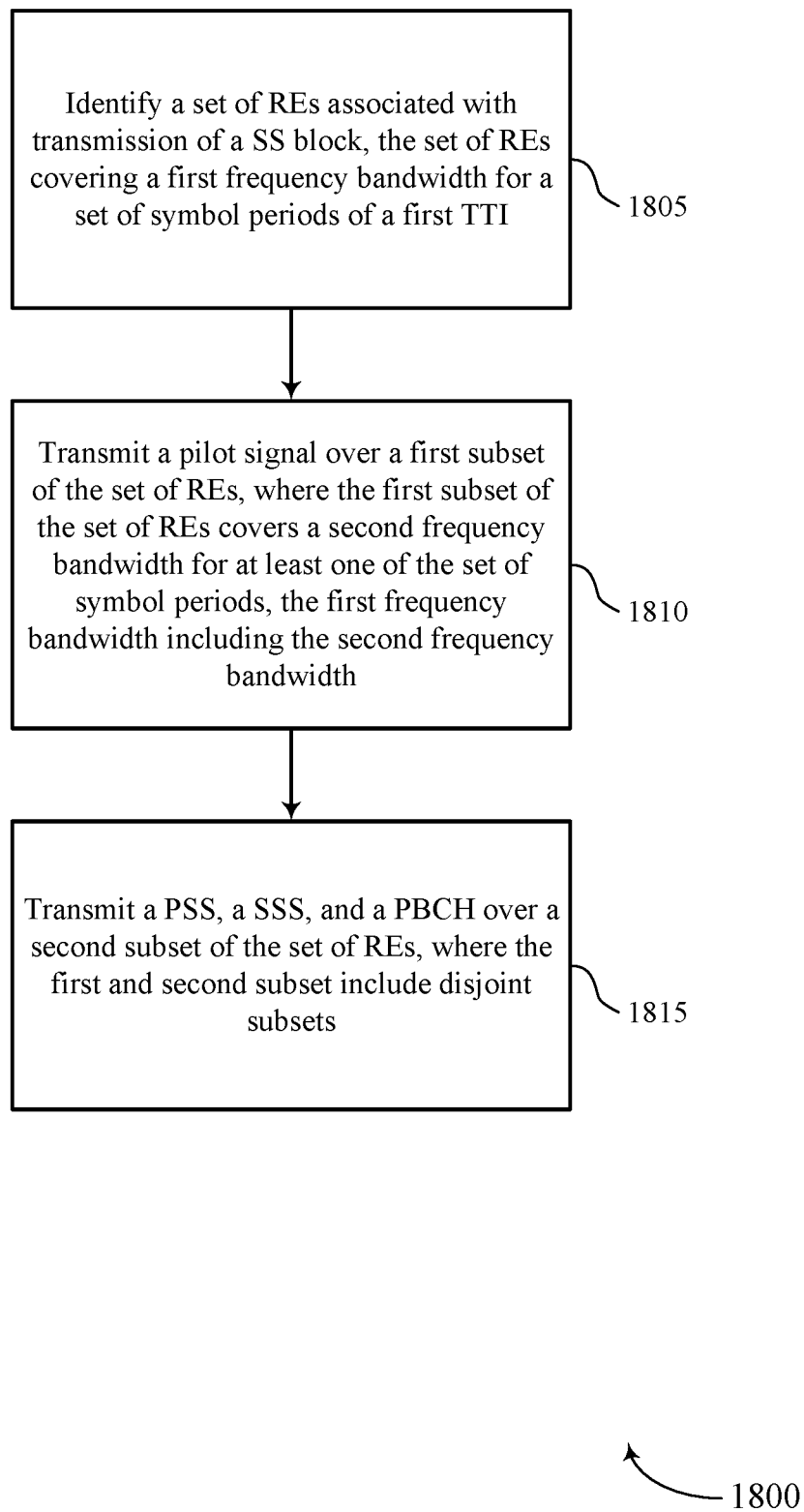

FIG. 18 shows a flowchart illustrating a method 1800 in accordance with aspects of the present disclosure. The operations of method 1800 may be implemented by a base station 105 or its components as described herein. For example, the operations of method 1800 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1805, the base station 105 may identify a set of REs associated with transmission of a SS block, the set of REs covering a first frequency bandwidth for a plurality of symbol periods of a first TTI. The operations of 1805 may be performed according to the methods described herein. In certain examples, aspects of the operations of 1805 may be performed by a SS block manager as described with reference to FIGS. 10 through 13.

At 1810, the base station 105 may transmit a pilot signal over a first subset of the set of REs, wherein the first subset of the set of REs covers a second frequency bandwidth for at least one of the plurality of symbol periods, the first frequency bandwidth comprising the second frequency bandwidth. The operations of 1810 may be performed according to the methods described herein. In certain examples, aspects of the operations of 1810 may be performed by a pilot signal manager as described with reference to FIGS. 10 through 13.

At 1815, the base station 105 may transmit a PSS, SSS, and PBCH (e.g., or some subset thereof) over a second subset of the set of REs, wherein the first and second subset comprise disjoint subsets. The operations of 1815 may be performed according to the methods described herein. In certain examples, aspects of the operations of 1815 may be performed by a SS block manager as described with reference to FIGS. 10 through 13. In some cases, the operations of block 1810 and 1815 may be performed at the same time (e.g., may be coordinated).

Figure 19:
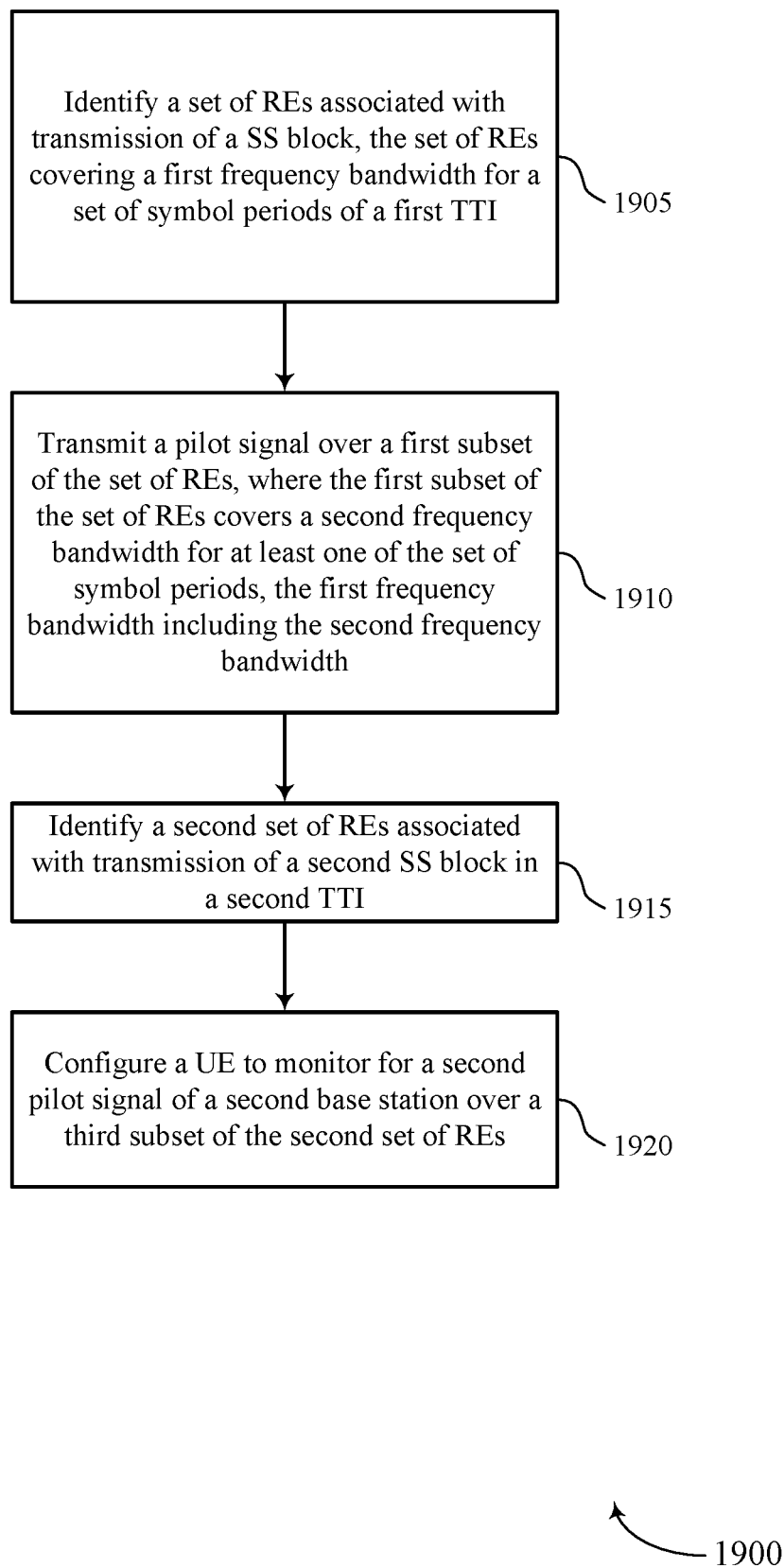

FIG. 19 shows a flowchart illustrating a method 1900 in accordance with aspects of the present disclosure. The operations of method 1900 may be implemented by a base station 105 or its components as described herein. For example, the operations of method 1900 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1905, the base station 105 may identify a set of REs associated with transmission of a SS block, the set of REs covering a first frequency bandwidth for a plurality of symbol periods of a first TTI. The operations of 1905 may be performed according to the methods described herein. In certain examples, aspects of the operations of 1905 may be performed by a SS block manager as described with reference to FIGS. 10 through 13.

At 1910, the base station 105 may transmit a pilot signal over a first subset of the set of REs, wherein the first subset of the set of REs covers a second frequency bandwidth for at least one of the plurality of symbol periods, the first frequency bandwidth comprising the second frequency bandwidth. The operations of 1910 may be performed according to the methods described herein. In certain examples, aspects of the operations of 1910 may be performed by a pilot signal manager as described with reference to FIGS. 10 through 13.

At 1915, the base station 105 may identify a second set of REs associated with transmission of a second SS block in a second TTI. The operations of 1915 may be performed according to the methods described herein. In certain examples, aspects of the operations of block 1915 may be performed by a SS block manager as described with reference to FIGS. 10 through 13.

At 1920, the base station 105 may configure a UE to monitor for a second pilot signal of a second base station over a third subset of the second set of REs. The operations of 1920 may be performed according to the methods described herein. In certain examples, aspects of the operations of 1920 may be performed by a configuration manager as described with reference to FIGS. 10 through 13.

Figure 20:
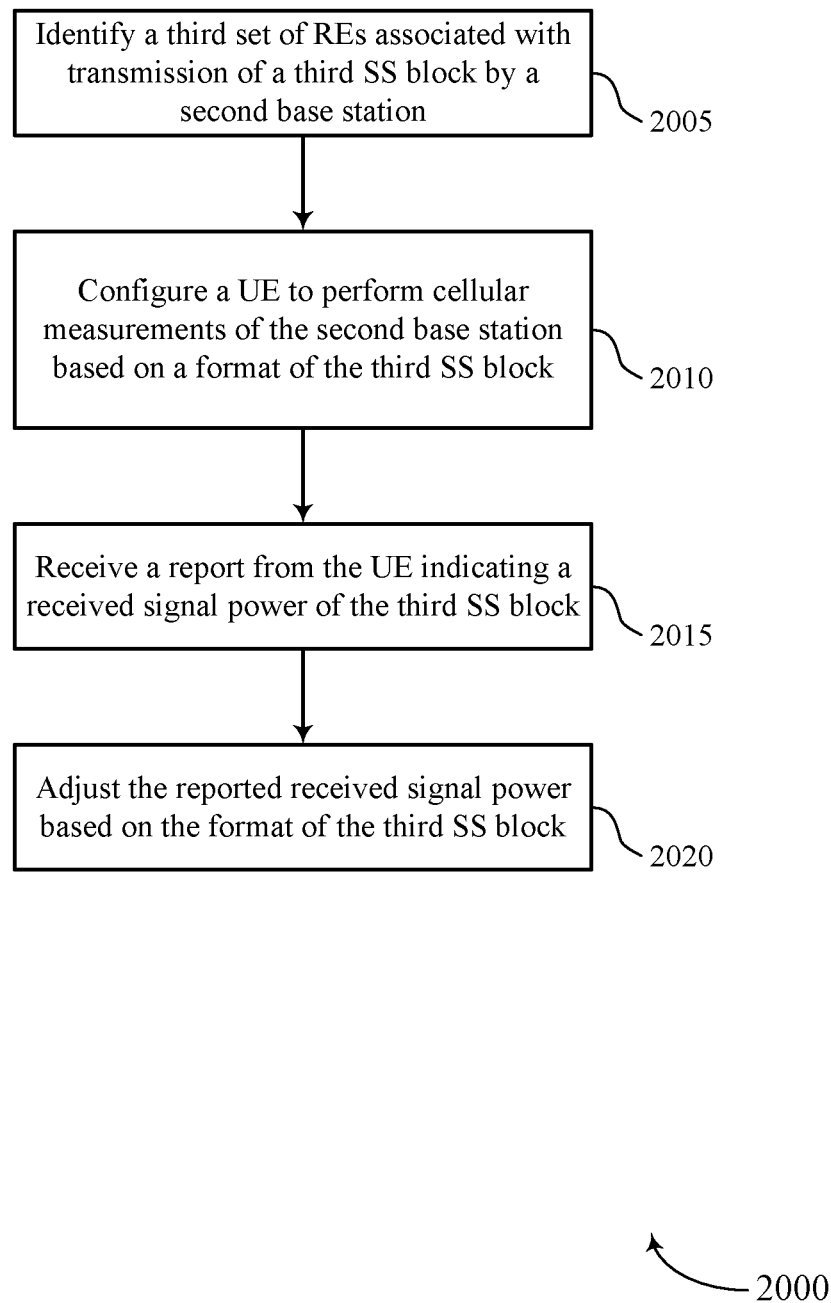

FIG. 20 shows a flowchart illustrating a method 2000 in accordance with aspects of the present disclosure. The operations of method 2000 may be implemented by a base station 105 or its components as described herein. For example, the operations of method 2000 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 2005, the base station 105 may identify a third set of REs associated with transmission of a third SS block by a second base station 105. The operations of 2005 may be performed according to the methods described herein. In certain examples, aspects of the operations of 2005 may be performed by a SS block manager as described with reference to FIGS. 10 through 13.

At 2010, the base station 105 may configure a UE to perform cellular measurements of the second base station based at least in part on a format of the third SS block. The operations of 2010 may be performed according to the methods described herein. In certain examples, aspects of the operations of 2010 may be performed by a configuration manager as described with reference to FIGS. 10 through 13.

At 2015, the base station 105 may receive a report from the UE indicating a received signal power of the third SS block. The operations of 2015 may be performed according to the methods described herein. In certain examples, aspects of the operations of 2015 may be performed by a pilot signal manager as described with reference to FIGS. 10 through 13.

At 2020, the base station 105 may adjust the reported received signal power based at least in part on the format of the third SS block. The operations of 2020 may be performed according to the methods described herein. In certain examples, aspects of the operations of 2020 may be performed by a location manager as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
establishing a first communication link with a first base station;
identifying a set of resource elements (REs) associated with transmission of a synchronization signal (SS) block, the set of REs covering a first frequency bandwidth for a plurality of symbol periods; and
receiving a pilot signal from a second base station over a first subset of the set of REs, the first subset of the set of REs covering a second frequency bandwidth for at least one of the plurality of symbol periods, wherein the first frequency bandwidth comprises the second frequency bandwidth.

2. The method of claim 1, further comprising:
measuring a signal strength of the pilot signal received from the second base station; and
reporting the measured signal strength to the first base station, wherein the measured signal strength is reported by a user equipment (UE) for estimating a location of the UE.

3. The method of claim 1, further comprising:
detecting a physical cell identifier (PCI) of the second base station based at least in part on the pilot signal.

4. The method of claim 3, further comprising:
receiving, from the first base station, a set of candidate physical cell identifiers (PCIs) comprising the PCI of the second base station.

5. The method of claim 3, further comprising:
reporting, to the first base station, the detected PCI of the second base station, a signal strength of the pilot signal, or both.

6. The method of claim 5, wherein the detected PCI of the second base station, the signal strength of the pilot signal, or both are reported by a user equipment (UE) for estimating a location of the UE.

7. The method of claim 5, further comprising:
participating in a handover procedure based at least in part on the detected PCI of the second base station, the signal strength of the pilot signal, or both.

8. The method of claim 1, further comprising:
receiving, from the first base station, a primary synchronization signal (PSS), a secondary synchronization signal (SSS), a physical broadcast channel (PBCH), or some combination thereof over a second subset of the set of REs, wherein the first subset and the second subset comprise disjoint subsets.

9. A method for wireless communication, comprising:
identifying a set of resource elements (REs) associated with transmission of a synchronization signal (SS) block, the set of REs covering a first frequency bandwidth for a plurality of symbol periods of a first transmission time interval (TTI); and transmitting a pilot signal over a first subset of the set of REs, wherein the first subset of the set of REs covers a second frequency bandwidth for at least one of the plurality of symbol periods, the first frequency bandwidth comprising the second frequency bandwidth.

10. The method of claim 9, further comprising:
puncturing one or more SS block components selected from the group consisting of a primary synchronization signal (PSS), a secondary synchronization signal (SSS), and a physical broadcast channel (PBCH); and
adjusting a transmit power of the pilot signal based at least in part on the puncturing.

11. The method of claim 9, further comprising:
transmitting a primary synchronization signal (PSS), a secondary synchronization signal (SSS), and a physical broadcast channel (PBCH) over a second subset of the set of REs, wherein the first and second subset comprise disjoint subsets.

12. The method of claim 9, wherein the pilot signal is based at least in part on a physical cell identifier (PCI) of the base station.

13. The method of claim 9, further comprising:
identifying a second set of REs associated with transmission of a second SS block in a second TTI; and
configuring a user equipment (UE) to monitor for a second pilot signal of a second base station over a third subset of the second set of REs.

14. The method of claim 13, further comprising:
transmitting the second SS block comprising a primary synchronization signal (PSS), a secondary synchronization signal (SSS), and a physical broadcast channel (PBCH) over a fourth subset of the second set of REs, wherein the third subset and the fourth subset comprise disjoint subsets.

15. The method of claim 13, wherein configuring the UE comprises:
providing to the UE a set of candidate physical cell identifiers (PCIs) including a PCI of the second base station.

16. The method of claim 13, further comprising:
receiving a report from the UE indicating reception of the second pilot signal.

17. The method of claim 16, further comprising:
estimating a location of the UE based at least in part on the report.

18. The method of claim 9, further comprising:
identifying a third set of REs associated with transmission of a third SS block by a second base station;
configuring a user equipment (UE) to perform cellular measurements of the second base station based at least in part on a format of the third SS block;
receiving a report from the UE indicating a received signal power of the third SS block; and
adjusting the reported received signal power based at least in part on the format of the third SS block.

19. An apparatus for wireless communication, comprising:
a processor;
memory in electronic communication with the processor; and
instructions stored in the memory and operable, when executed by the processor, to cause the apparatus to:
establish a first communication link with a first base station;
identify a set of resource elements (REs) associated with transmission of a synchronization signal (SS) block, the set of REs covering a first frequency bandwidth for a plurality of symbol periods; and
receive a pilot signal from a second base station over a first subset of the set of REs, the first subset of the set of REs covering a second frequency bandwidth for at least one of the plurality of symbol periods, wherein the first frequency bandwidth comprises the second frequency bandwidth.

20. The apparatus of claim 19, wherein the instructions are further executable by the processor to:
measure a signal strength of the pilot signal received from the second base station; and
report the measured signal strength to the first base station, wherein the measured signal strength being reported by the apparatus associated with a user equipment (UE) for estimating a location of the UE.

21. The apparatus of claim 19, wherein the instructions are further executable by the processor to:
detect a physical cell identifier (PCI) of the second base station based at least in part on the pilot signal.

22. The apparatus of claim 21, wherein the instructions are further executable by the processor to:
receive, from the first base station, a set of candidate physical cell identifiers (PCIs) comprising the PCI of the second base station.

23. The apparatus of claim 21, wherein the instructions are further executable by the processor to:
report, to the first base station, the detected PCI of the second base station, a signal strength of the pilot signal, or both.

24. The apparatus of claim 23, wherein the detected PCI of the second base station, the signal strength of the pilot signal, or both being reported by the apparatus associated with a user equipment (UE) for estimating a location of the UE.

25. The apparatus of claim 23, wherein the instructions are further executable by the processor to:
participate in a handover procedure based at least in part on the detected PCI of the second base station, the signal strength of the pilot signal, or both.

26. The apparatus of claim 19, wherein the instructions are further executable by the processor to:
receive, from the first base station, a primary synchronization signal (PSS), a secondary synchronization signal (SSS), a physical broadcast channel (PBCH), or some combination thereof over a second subset of the set of REs, wherein the first subset and the second subset comprise disjoint subsets.

27. An apparatus for wireless communication, comprising:
a processor;
memory in electronic communication with the processor; and
instructions stored in the memory and operable, when executed by the processor, to cause the apparatus to:
identify a set of resource elements (REs) associated with transmission of a synchronization signal (SS) block, the set of REs covering a first frequency bandwidth for a plurality of symbol periods of a first transmission time interval (TTI); and
transmit a pilot signal over a first subset of the set of REs, wherein the first subset of the set of REs covers a second frequency bandwidth for at least one of the plurality of symbol periods, the first frequency bandwidth comprising the second frequency bandwidth.

28. The apparatus of claim 27, wherein the instructions are further executable by the processor to:

puncture one or more SS block components selected from the group consisting of a primary synchronization signal (PSS), a secondary synchronization signal (SSS), and a physical broadcast channel (PBCH); and adjust a transmit power of the pilot signal based at least in part on the puncturing.

29. The apparatus of claim 27, wherein the instructions are further executable by the processor to:

transmit a primary synchronization signal (PSS), a secondary synchronization signal (SSS), and a physical broadcast channel (PBCH) over a second subset of the set of REs, wherein the first and second subset comprise disjoint subsets.

30. The apparatus of claim 27, wherein the instructions are further executable by the processor to:

identify a second set of REs associated with transmission of a second SS block in a second TTI; and configure a user equipment (UE) to monitor for a second pilot signal of a second base station over a third subset of the second set of REs.

\* \* \* \* \*